US010877727B2

(12) United States Patent
Vaquero Avilés-Casco et al.

(10) Patent No.: US 10,877,727 B2
(45) Date of Patent: Dec. 29, 2020

(54) COMBINING RESULTS FROM FIRST AND SECOND SPEAKER RECOGNITION PROCESSES

(71) Applicant: Cirrus Logic International Semiconductor Ltd., Edinburgh (GB)

(72) Inventors: Carlos Vaquero Avilés-Casco, Madrid (ES); Marta García Gomar, Madrid (ES); David Martínez González, Saragossa (ES)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/457,294

(22) Filed: Jun. 28, 2019

(65) Prior Publication Data

US 2019/0324719 A1    Oct. 24, 2019

Related U.S. Application Data

(63) Continuation of application No. 15/612,606, filed on Jun. 2, 2017, now Pat. No. 10,379,810.

(Continued)

(51) Int. Cl.
*G10L 17/06*     (2013.01)
*G10L 17/10*     (2013.01)
(Continued)

(52) U.S. Cl.
CPC ............ *G06F 3/167* (2013.01); *G10L 17/00* (2013.01); *G10L 17/10* (2013.01); *G10L 17/22* (2013.01); *G10L 15/22* (2013.01)

(58) Field of Classification Search
CPC ....... G10L 17/005; G10L 17/06; G10L 17/08; G10L 17/10; G10L 17/18; G10L 17/22; G10L 17/24; G10L 15/22; G10L 2015/223
(Continued)

(56) References Cited

U.S. PATENT DOCUMENTS 5,774,858 A * 6/1998 Taubkin ................. G10L 17/00
                                                           704/273
5,839,103 A   11/1998 Mammone et al.
(Continued)

FOREIGN PATENT DOCUMENTS

WO     199834216 A2     8/1998
WO    2008047339 A2     4/2008

OTHER PUBLICATIONS

Campbell, Joseph P. et al., Fusing High- and Low-Level Features for Speaker Recognition, Sep. 1, 2003, Sep. 4, 2003, p. 2665, XP007007102, section 4.3.

(Continued)

*Primary Examiner* — Martin Lerner
(74) *Attorney, Agent, or Firm* — Jackson Walker L.L.P.

(57) ABSTRACT

A received signal represents a user's speech. A first speaker recognition process is performed on a first portion of the received signal, to obtain a first output result. A second speaker recognition process is performed on a second portion of the received signal that is different from the first portion of the received signal, to obtain a second output result. The second speaker recognition process is different from the first speaker recognition process. The first and second output results are combined to obtain a combined output result indicating a likelihood that the user is a registered user.

15 Claims, 10 Drawing Sheets

Related U.S. Application Data

(60) Provisional application No. 62/346,036, filed on Jun. 6, 2016.

(51) Int. Cl.
  *G10L 17/22* (2013.01)
  *G06F 3/16* (2006.01)
  *G10L 17/00* (2013.01)
  *G10L 15/22* (2006.01)

(58) Field of Classification Search
  USPC .............. 704/232, 246, 248, 249, 270, 273
  See application file for complete search history.

(56) References Cited

U.S. PATENT DOCUMENTS

| | | | |
|---|---|---|---|
| 5,950,157 A | 9/1999 | Heck et al. | |
| 6,107,935 A * | 8/2000 | Comerford | G10L 17/06 704/246 |
| 6,519,561 B1 | 2/2003 | Farrell et al. | |
| 6,618,702 B1 | 9/2003 | Kohler et al. | |
| 6,760,701 B2 | 7/2004 | Sharma et al. | |
| 7,228,279 B2 | 6/2007 | Chaudhari et al. | |
| 9,431,016 B2 * | 8/2016 | Aviles-Casco | G10L 17/06 |
| 9,607,137 B2 * | 3/2017 | Nicholson | G06F 21/32 |
| 9,626,971 B2 | 4/2017 | Rodriguez et al. | |
| 9,767,806 B2 * | 9/2017 | Gimenez | G10L 17/22 |
| 10,013,985 B2 * | 7/2018 | Yue | G10L 17/24 |
| 10,379,810 B2 * | 8/2019 | Vaquero Aviles-Casco | G10L 17/10 |
| 2002/0002465 A1 * | 1/2002 | Maes | G10L 17/04 704/275 |
| 2003/0033143 A1 | 2/2003 | Aronowitz | |
| 2003/0200087 A1 | 10/2003 | Aronowitz | |
| 2005/0049862 A1 * | 3/2005 | Choi | G10L 17/00 704/270 |
| 2005/0216433 A1 * | 9/2005 | Bland | G10L 25/48 |
| 2007/0129941 A1 | 6/2007 | Tavares | |
| 2008/0010065 A1 | 1/2008 | Bratt et al. | |
| 2008/0059176 A1 | 3/2008 | Ravi et al. | |
| 2009/0006093 A1 | 1/2009 | Das | |
| 2010/0131273 A1 | 5/2010 | Aley-Raz et al. | |
| 2011/0246198 A1 * | 10/2011 | Asenjo | G10L 17/06 704/247 |
| 2013/0043977 A1 | 2/2013 | Velius et al. | |
| 2014/0029757 A1 * | 1/2014 | Aronowitz | G10L 17/06 381/59 |
| 2014/0081638 A1 | 3/2014 | Lopez et al. | |
| 2014/0214676 A1 * | 7/2014 | Bukai | G10L 17/04 705/44 |
| 2014/0249817 A1 | 9/2014 | Hart et al. | |
| 2014/0257812 A1 | 9/2014 | Mozer | |
| 2015/0088509 A1 | 3/2015 | Gimenez et al. | |
| 2015/0112682 A1 * | 4/2015 | Rodriguez | G10L 17/06 704/249 |
| 2015/0161990 A1 * | 6/2015 | Sharifi | G10L 17/22 704/251 |
| 2015/0206538 A1 | 7/2015 | Aviles-Casco et al. | |
| 2015/0245154 A1 * | 8/2015 | Dadu | G10L 17/22 381/56 |
| 2015/0302855 A1 * | 10/2015 | Kim | G10L 17/22 704/275 |
| 2016/0012824 A1 | 1/2016 | Schroeter | |
| 2016/0125877 A1 * | 5/2016 | Foerster | G10L 17/18 704/232 |
| 2016/0125879 A1 * | 5/2016 | Lovitt | G10L 17/10 704/275 |
| 2016/0248768 A1 * | 8/2016 | McLaren | G10L 17/22 |
| 2016/0307572 A1 | 10/2016 | Aviles-Casco et al. | |
| 2016/0378964 A1 * | 12/2016 | Singh | A61B 5/4803 340/5.52 |
| 2017/0220786 A1 * | 8/2017 | Guo | G06F 21/36 |
| 2019/0228778 A1 * | 7/2019 | Lesso | G10L 17/06 |

OTHER PUBLICATIONS

Combined Search and Examination Report under Sections 17 and 18(3), Application No. GB1611323.5, dated Nov. 2, 2016.

International Search Report and Written Opinion, International Application No. PCT/GB2016/051954, dated Apr. 7, 2017.

Misra et al., "Anti-spoofing System: An Investigation of measures to Detect Synthetic and Human Speech", Interspeech 2015, Dec. 6-10, 2015, pp. 3466-3470 (Year: 2015).

Wu et al., "Anti-spoofing for Text-Independent Speaker Verification: An Initial Database, Comparison of Countermeasures, and Human Performance", IEEE/ACM Transactions on Audio, Speech, and Language Processing, vol. 24, Issue 4, Apr. 2016, pp. 768-783 (Year: 2016).

Wu et al., "A study on replay attack and anti-spoofing for text-dependent speaker verification", Signal and Information Processing Association Summit and Conference (APSIPA), Dec. 9-12, 2014, 5 Pages (Year: 2014).

\* cited by examiner

COMBINING RESULTS FROM FIRST AND SECOND SPEAKER RECOGNITION PROCESSES

The present disclosure claims priority to U.S. Non-Provisional patent application Ser. No. 15/612,606, filed Jun. 2, 2017, now U.S. Pat. No. 10,379,810, issued on Aug. 13, 2019, which claims priority to U.S. Provisional Patent Application Ser. No. 62/346,036, filed Jun. 6, 2016, each of which is incorporated by reference herein in its entirety.

TECHNICAL FIELD

The embodiments described herein relate to a method and system for use in a voice user interface, for example for allowing a user to control the operation of a device using speech.

BACKGROUND OF THE INVENTION

Voice user interfaces are provided to allow a user to interact with a system using their voice. One advantage of this, for example in devices such as smartphones, tablet computers and the like, is that it allows the user to operate the device in a hands-free manner.

In one typical system, the user wakes the voice user interface from a low-power standby mode by speaking a trigger phrase. Speech recognition techniques are used to detect that the trigger phrase has been spoken and, separately, a speaker recognition process is used to confirm that the trigger phrase was spoken by a registered user of the device.

The voice user interface may then provide a prompt to the user, to confirm that the system is active, and the user may then speak a command, which can be recognised by the voice user interface using speech recognition techniques.

The voice user interface may then act on that spoken command. For example, if the spoken command asks for publicly available information, the spoken command may be recognised, and used to generate a query to an internet search engine in order to be able to supply that information to the user.

However, in other cases, for example if the spoken command relates to personal information, the level of authentication provided by the speaker recognition process may be considered insufficient for the voice user interface to act on that command. In such cases, the user may be asked to provide an additional form of authentication, for example by entering a PIN number or password through a keypad of the device, or by providing additional biometric authentication, such as a fingerprint scan.

This means that the user is no longer able to operate the device in a hands-free manner.

SUMMARY OF THE INVENTION

According to the embodiments described herein, there is provided a method and a system which reduce or avoid one or more of the disadvantages mentioned above.

According to a first aspect of the invention, there is provided a method of processing a received signal representing a user's speech, the method comprising: performing a first speaker recognition process on a first portion of the received signal, to obtain a first output result; performing a second speaker recognition process on a second portion of the received signal that is different from the first portion of the received signal, to obtain a second output result, wherein the second speaker recognition process is different from the first speaker recognition process; and combining the first and second output results to obtain a combined output result indicating a likelihood that the user is a registered user.

The method may comprise applying respective weighting values to the first and second output results and combining the weighted results. More specifically, the method may comprise forming a weighted sum of the first and second output results. The weighting values may be predetermined weighting values. Alternatively, the weighting values may be variable weighting values. In that case, at least one of the weighting values may be determined based on at least one measure relating to a quality of a respective sample. The weighting value may be determined as a piece-wise constant function of the measure relating to the quality of the respective sample, or the weighting value may be determined as a continuous function of the measure relating to the quality of the respective sample.

The method may comprise applying the first and second output results as inputs to a neural network, and obtaining the combined output result as an output of the neural network. The method may then further comprise applying at least one measure relating to a quality of a respective sample as an input to the neural network. The neural network may have been adapted in a prior development phase.

The method may comprise combining the first and second output results based on at least one measure relating to a quality of a respective sample.

The at least one measure relating to the quality of the respective sample may comprise a measure relating to a property of the respective portion of the received signal, or may comprise a measure relating to a property of the speech represented by the respective portion of the received signal. In that case, the at least one measure relating to the quality of the respective sample may comprise a measure of an amount of speech represented by the respective portion of the received signal, or may comprise a measure of a degree of fit of the respective portion of the received signal to a background model of the respective speaker recognition process.

The at least one measure relating to the quality of the respective sample may comprise: a measure relating to a degree of saturation of the respective portion of the received signal; or a measure of a signal-to-noise ratio of the respective portion of the received signal; or a measure of a signal-to-interference ratio of the respective portion of the received signal; or a measure of a direct-to-reflected ratio of the respective portion of the received signal; or a measure of a direction from which the respective portion of the received signal was received; or a measure of a range from which the respective portion of the received signal was received.

The first and second speaker recognition processes may use different models of the user's speech, and/or may use different background models.

At least one of the models of the user's speech or background models may comprise a Hidden Markov Model.

At least one of the models of the user's speech or background models may comprise a Gaussian Mixture Model. In that case, the Gaussian Mixture Model may use factor analysis. The first and second speaker recognition processes may use Gaussian Mixture Models with different numbers of Gaussians.

The first and second speaker recognition process may use different verification methods.

The method may further comprise performing an anti-spoofing process on at least one of the first and second portions of the received signal. The antispoofing process may comprise computing a likelihood ratio based on a feature vector obtained from the respective portion of the received signal. The feature vector may comprise one or more metric selected from a spectral ratio, a low frequency ratio, a feature vector squared Mahalanobis distance.

The method may comprise performing respective antispoofing processes on the first and second portions of the received signal to obtain first and second antispoofing scores respectively. The method may then comprise determining that the user is not a registered user if the first or second antispoofing score exceeds a respective threshold, or may comprise determining that the user is not a registered user if a function of the first and second antispoofing score exceeds a respective threshold.

The measure relating to the quality of the respective sample may comprise the respective antispoofing score obtained from the respective portion of the received signal.

The method may comprise combining the first and second output results and the first and second antispoofing scores to obtain the combined output result indicating the likelihood that the user is a registered user. In that case, the method may comprise combining the first and second output results and the first and second antispoofing scores in a classifier, or combining the first and second output results and the first and second antispoofing scores in a neural network.

The first portion of the received signal may comprise a trigger phrase while the second portion of the received signal comprises a command.

The first portion of the received signal may correspond to a first time window while the second portion of the received signal corresponds to a second time window, wherein the first time window does not overlap the second time window.

The first portion of the received signal may correspond to a first time window while the second portion of the received signal corresponds to a second time window, wherein the first time window at least partially overlaps the second time window. In that case, the second time window may comprise the first time window.

The method may comprise performing at least one further speaker recognition process on at least one further portion of the received signal to obtain at least one respective further output result; and combining the at least one further output result with the first and second output results to obtain the combined output result indicating a likelihood that the user is a registered user.

The method may further comprise performing speech recognition on at least the first portion of the received signal.

The method may further comprise providing feedback to the user based on the combined output result. The feedback may comprise audible, visual or haptic feedback.

The method may comprise allowing or preventing a further action by the user based on the combined output result.

According to a further aspect, there is provided a device for processing a received signal representing a user's speech, for performing speaker recognition, wherein the device is configured to: perform a first speaker recognition process on a first portion of the received signal, to obtain a first output result; perform a second speaker recognition process on a second portion of the received signal that is different from the first portion of the received signal, to obtain a second output result, wherein the second speaker recognition process is different from the first speaker recognition process; and combine the first and second output results to obtain a combined output result indicating a likelihood that the user is a registered user.

The device may comprise a mobile telephone, an audio player, a video player, a PDA, a mobile computing platform, a games device, a remote controller device, a toy, a machine, or a home automation controller.

The device may be further configured for performing speech recognition on at least a portion of the received signal.

The device may be further configured for transferring at least a portion of the received signal to a remote device for speech recognition. In that case, the device may be further configured for receiving a result of the speech recognition.

According to a further aspect, there is provided an integrated circuit device for processing a received signal representing a user's speech, for performing speaker recognition, wherein the integrated circuit device is configured to: perform a first speaker recognition process on a first portion of the received signal, to obtain a first output result; perform a second speaker recognition process on a second portion of the received signal that is different from the first portion of the received signal, to obtain a second output result, wherein the second speaker recognition process is different from the first speaker recognition process; and combine the first and second output results to obtain a combined output result indicating a likelihood that the user is a registered user.

The first and second speaker recognition processes may use at least one user or background model stored in said integrated circuit device.

The first and second speaker recognition processes may use at least one user or background model stored in a separate integrated circuit device.

According to a further aspect, there is provided a computer program product, comprising a computer-readable tangible medium, and instructions for performing a method according to the first aspect.

According to another aspect of the invention, there is provided a method of processing a received signal representing a user's speech, the method comprising: performing a first speaker recognition process on a first portion of the received signal, to obtain a first output result; performing a second speaker recognition process on a second portion of the received signal, to obtain a second output result; combining the first and second output results to obtain a combined output result indicating a likelihood that the user is a registered user; determining if the indicated likelihood that the user is a registered user is higher than a threshold value; performing a speech recognition process on the second portion of the received signal to obtain a command contained in the second portion of the received signal; and acting on the obtained command if the indicated likelihood is higher than the threshold value.

The method may comprise applying respective weighting values to the first and second output results and combining the weighted results. More specifically, the method may comprise forming a weighted sum of the first and second output results. The weighting values may be predetermined weighting values. Alternatively, the weighting values may be variable weighting values. In that case, at least one of the weighting values may be determined based on at least one measure relating to a quality of a respective sample. The weighting value may be determined as a piece-wise constant function of the measure relating to the quality of the respective sample, or the weighting value may be determined as a continuous function of the measure relating to the quality of the respective sample.

The method may comprise applying the first and second output results as inputs to a neural network, and obtaining the combined output result as an output of the neural network. The method may then further comprise applying at least one measure relating to a quality of a respective sample as an input to the neural network. The neural network may have been adapted in a prior development phase.

The method may comprise combining the first and second output results based on at least one measure relating to a quality of a respective sample.

The at least one measure relating to the quality of the respective sample may comprise a measure relating to a property of the respective portion of the received signal, or may comprise a measure relating to a property of the speech represented by the respective portion of the received signal. In that case, the at least one measure relating to the quality of the respective sample may comprise a measure of an amount of speech represented by the respective portion of the received signal, or may comprise a measure of a degree of fit of the respective portion of the received signal to a background model of the respective speaker recognition process.

The at least one measure relating to the quality of the respective sample may comprise: a measure relating to a degree of saturation of the respective portion of the received signal; or a measure of a signal-to-noise ratio of the respective portion of the received signal; or a measure of a signal-to-interference ratio of the respective portion of the received signal; or a measure of a direct-to-reflected ratio of the respective portion of the received signal; or a measure of a direction from which the respective portion of the received signal was received; or a measure of a range from which the respective portion of the received signal was received.

The first and second speaker recognition processes may be different.

The first and second speaker recognition processes may use different models of the user's speech, and/or may use different background models.

At least one of the models of the user's speech or background models may comprise a Hidden Markov Model.

At least one of the models of the user's speech or background models may comprise a Gaussian Mixture Model. In that case, the Gaussian Mixture Model may use factor analysis. The first and second speaker recognition processes may use Gaussian Mixture Models with different numbers of Gaussians.

The first and second speaker recognition process may use different verification methods.

The method may further comprise performing an antispoofing process on at least one of the first and second portions of the received signal. The antispoofing process may comprise computing a likelihood ratio based on a feature vector obtained from the respective portion of the received signal. The feature vector may comprise one or more metric selected from a spectral ratio, a low frequency ratio, a feature vector squared Mahalanobis distance.

The method may comprise performing respective antispoofing processes on the first and second portions of the received signal to obtain first and second antispoofing scores respectively. The method may then comprise determining that the user is not a registered user if the first or second antispoofing score exceeds a respective threshold, or may comprise determining that the user is not a registered user if a function of the first and second antispoofing score exceeds a respective threshold.

The measure relating to the quality of the respective sample may comprise the respective antispoofing score obtained from the respective portion of the received signal.

The method may comprise combining the first and second output results and the first and second antispoofing scores to obtain the combined output result indicating the likelihood that the user is a registered user. In that case, the method may comprise combining the first and second output results and the first and second antispoofing scores in a classifier, or combining the first and second output results and the first and second antispoofing scores in a neural network.

The first portion of the received signal may comprise a trigger phrase while the second portion of the received signal comprises a command.

The first portion of the received signal may correspond to a first time window while the second portion of the received signal corresponds to a second time window, wherein the first time window does not overlap the second time window.

The first portion of the received signal may correspond to a first time window while the second portion of the received signal corresponds to a second time window, wherein the first time window at least partially overlaps the second time window. In that case, the second time window may comprise the first time window.

The method may comprise performing at least one further speaker recognition process on at least one further portion of the received signal to obtain at least one respective further output result; and combining the at least one further output result with the first and second output results to obtain the combined output result indicating a likelihood that the user is a registered user.

The method may further comprise performing speech recognition on at least the first portion of the received signal.

The method may further comprise providing feedback to the user based on the combined output result. The feedback may comprise audible, visual or haptic feedback.

The method may comprise allowing or preventing a further action by the user based on the combined output result.

According to a further aspect, there is provided a device for processing a received signal representing a user's speech, for performing speaker recognition, wherein the device is configured to: perform a first speaker recognition process on a first portion of the received signal, to obtain a first output result; perform a second speaker recognition process on a second portion of the received signal that is different from the first portion of the received signal, to obtain a second output result, wherein the second speaker recognition process is different from the first speaker recognition process; and combine the first and second output results to obtain a combined output result indicating a likelihood that the user is a registered user.

The device may comprise a mobile telephone, an audio player, a video player, a PDA, a mobile computing platform, a games device, a remote controller device, a toy, a machine, or a home automation controller.

The device may be further configured for performing speech recognition on at least a portion of the received signal.

The device may be further configured for transferring at least a portion of the received signal to a remote device for speech recognition. In that case, the device may be further configured for receiving a result of the speech recognition.

According to a further aspect, there is provided an integrated circuit device for processing a received signal representing a user's speech, for performing speaker recognition, wherein the integrated circuit device is configured to: perform a first speaker recognition process on a first portion of the received signal, to obtain a first output result; perform a second speaker recognition process on a second portion of the received signal that is different from the first portion of the received signal, to obtain a second output result, wherein the second speaker recognition process is different from the first speaker recognition process; and combine the first and second output results to obtain a combined output result indicating a likelihood that the user is a registered user.

The first and second speaker recognition processes may use at least one user or background model stored in said device.

The first and second speaker recognition processes may use at least one user or background model stored in a separate integrated circuit device.

According to a further aspect, there is provided a computer program product, comprising a computer-readable tangible medium, and instructions for performing a method according to the other aspect of the invention.

The invention also provides a non-transitory computer readable storage medium having computer-executable instructions stored thereon that, when executed by processor circuitry, cause the processor circuitry to perform any of the methods set out above.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals, or may provide information indicating whether a speaker is or is not a particular individual, for the purposes of identification or authentication. Speech recognition refers to a technique for determining the content and/or the meaning of what is spoken, rather than recognising the person speaking.

Figure 1:
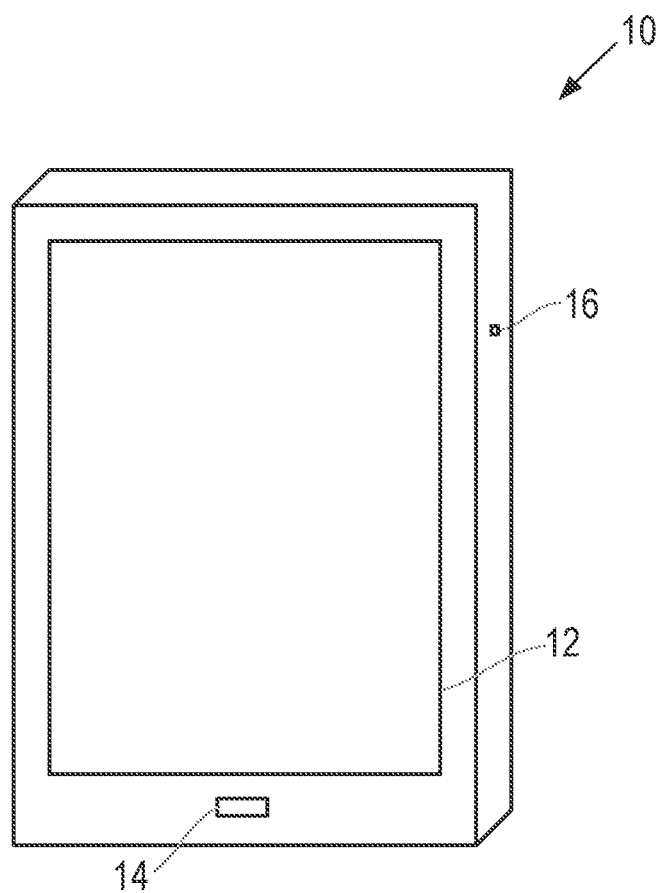
FIG. 1 is a schematic view of an electronic device.

FIG. 1 shows a device in accordance with one aspect of the invention. The device may be any suitable type of device, such as a tablet computer, a games console, a remote control device, a domestic appliance including a domestic temperature or lighting control system, a toy, a machine such as a robot, or the like, but in this illustrative example the device is a smartphone 10. The smartphone 10 may, by suitable software, be used as the control interface for controlling any other further device or system.

The smartphone 10 includes a screen 12 for displaying information to a user, a sound inlet 14, for allowing sound to be detected by a microphone, and a jack socket 16, or other port or receptacle, for allowing an accessory to be connected to the device.

Figure 2:
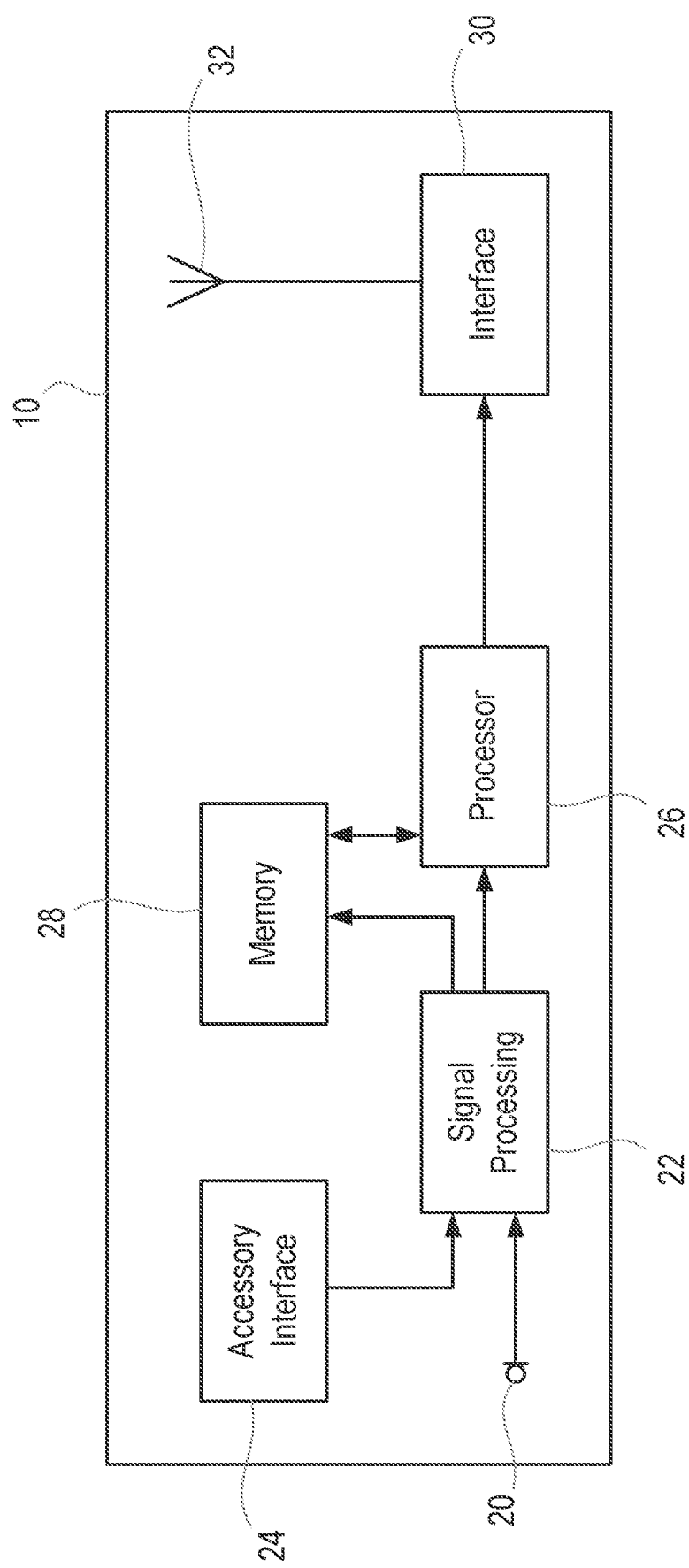
FIG. 2 is a further schematic diagram of an electronic device.

FIG. 2 is a schematic diagram showing the smartphone 10. In this example, the smartphone 10 includes a microphone 20, which may for example be located close to the sound inlet 14 shown in FIG. 1. Electronic signals generated by the microphone 20 are passed to a signal processing block 22, which performs initial signal processing of the signals, for example converting analog signals received from the microphone 20 into digital signals.

The smartphone 10 also includes an accessory interface 24, which may for example be located close to the jack socket 16 shown in FIG. 1. The jack socket 16 and the interface 24 may be suitable for allowing a headset accessory to be connected thereto, and signals received from a microphone on such an accessory are also passed to the signal processing block 22, which performs initial signal processing of the signals.

The signal processing block 22 is connected to a processor 26, which performs methods as described herein on the basis of data and program instructions stored in a memory 28.

The processor 28 is connected to an interface 30, which is itself connected to an antenna 32, allowing signals to be transmitted and received over an external network to remote devices.

In other examples, the device performing the processes described herein may receive the required input signals in a suitable form, without needing to perform any prior signal detection or signal processing and thus not requiring the device to comprise signal processing block 22.

In some examples, some of the processing described below may be performed on an external device communicated with via an external network, for example a remote computing server or a server in a home network. In other examples, all of the processing described below may be performed in a single device, without requiring the device to comprise any interface to any external device or network.

Figure 3:
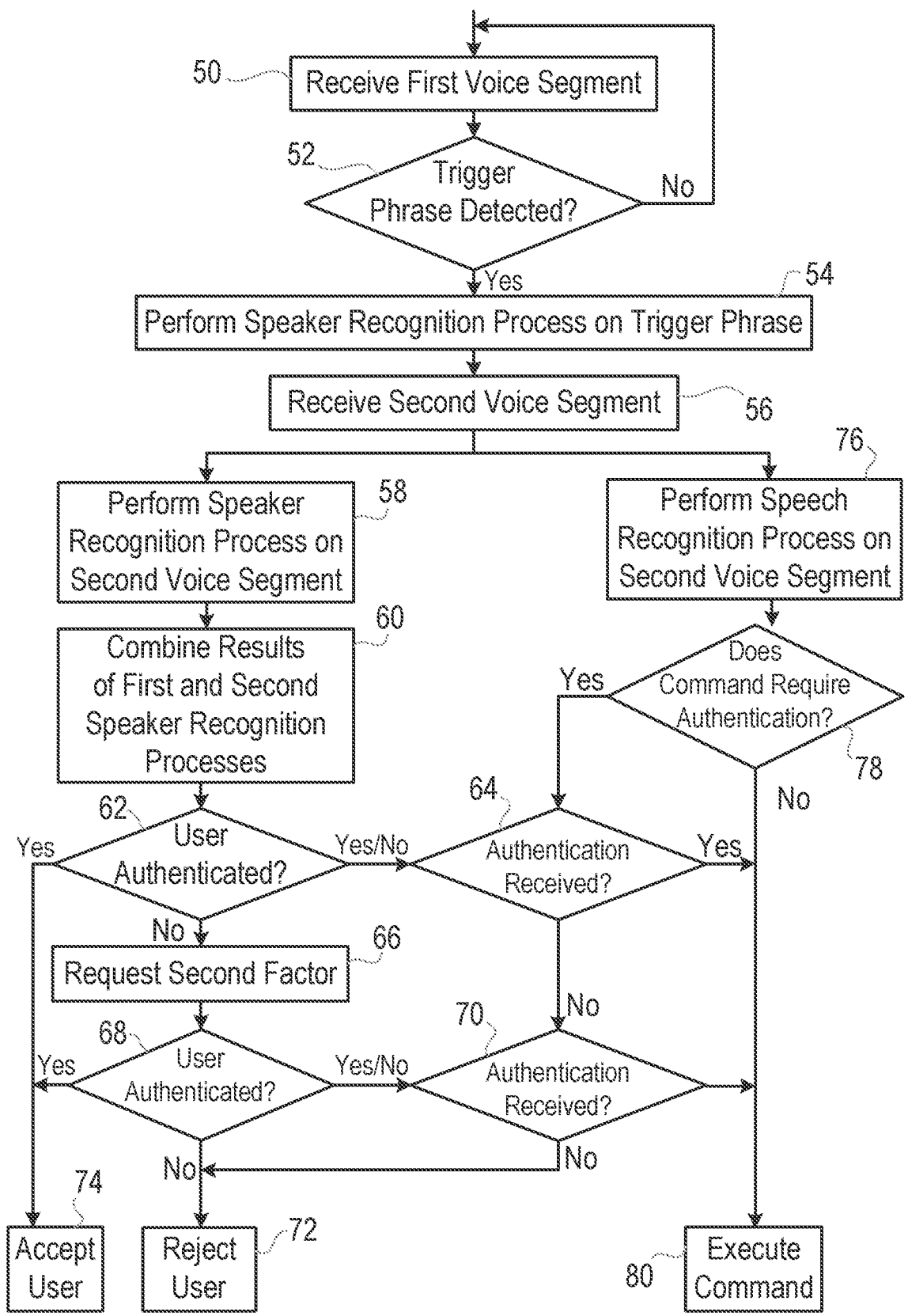
FIG. 3 is a flow chart, illustrating a method.

FIG. 3 is a flow chart, illustrating a method of operation of a voice user interface according to one embodiment.

As described in more detail below, the process shown in FIG. 3 is performed after a user has registered with the system, for example by providing one or more sets of voice samples that can be used to form one or more model of the user's speech. Typically, the registration or enrollment process requires the user to provide speech inputs, and then uses these speech inputs to form a model of the user's speech, starting from a particular background model defined in a prior development phase. Thus, the background model and the speech inputs are the inputs to the enrolment process that is used to form the model of the user's speech. Subsequently, during verification, as described in more detail below, further speech inputs are compared with the model of the user's speech, and with a background model, in order to provide an output. The output may for example be a numerical value indicating a likelihood that the speech inputs received during the verification phase were provided by the same user that provided the speech inputs during enrolment. The numerical value indicative of the likelihood may be for example a log likelihood ratio (LLR) or may be some more indirect indication, for example a metric of distance of extracted features of the speech sample from some one- or multi-dimensional threshold.

The voice user interface may spend the majority of its time in a standby state, in order to save power. A voice activity detection block may be provided, for determining when sounds that are detected by a microphone represent speech. In some embodiments, signals that are received from a microphone are stored. Then, when the voice activity block determines that the sounds that are detected by the microphone represent speech, those stored signals are analysed as described below.

In step 50, a signal is received from one or more microphone, and the signal represents a first voice segment, that is, the signal represents the first part of a user's speech.

In step 52, the signal representing the first voice segment is passed to a low power trigger phrase detector, which may for example be implemented in a processor (such as the processor 26 in the embodiment shown in FIG. 2) within the device, or may be implemented in a separate device, for example a computing server in a home or remote network.

The trigger phrase detector uses speech recognition techniques for determining whether the first voice segment contains a specific predetermined phrase, referred to herein as a trigger phrase or pass phrase. This is a phrase that the user is required to speak, in order to fully activate the voice user interface.

If the trigger phrase detector fails to recognise the trigger phrase at step 52, the process returns to step 50, in which the system continues monitoring the received signal for voice segments.

If it is determined at step 52 that the first voice segment contains the trigger phrase, the process passes to step 54, in which a speaker recognition process is performed on the first voice segment.

The speaker recognition process that is performed on the first voice segment operates with a first user model. Because the user is expected to be speaking a trigger phrase that is known in advance, the first user model may use text-constrained, or text-dependent, speaker recognition. That is, during an enrolment process performed by the user when first activating the speaker recognition feature of the device, the user was required to speak the trigger phrase multiple times. The enrolment process uses as its starting point a particular background model, which may for example be based upon the speech inputs from a large sample of other users, and the user's speech inputs are then used in forming the first user model. More specifically, features of the user's speech, such as Mel frequency Cepstrum Coefficient (MFCC) features may be used in forming the first user model.

The output of step 54 may for example be a numerical score (in the form of a likelihood ratio, or a distance, or in any other form). This numerical score relating to the first voice segment, or trigger phrase, is denoted here by $s_T$.

In step 56, a further signal is received from the one or more microphone, and this signal represents a second voice segment, that is, the signal represents the second part of a user's speech. This second voice segment may follow immediately on from the first voice segment. Alternatively, the system may provide a visual or audible prompt to the user on detecting the trigger phrase at step 52, and the second voice segment may then follow that prompt.

In step 58, a speaker recognition process is performed on the second voice segment.

The speaker recognition process that is performed on the second voice segment differs from the speaker recognition process that was performed on the first voice segment in step 54.

Each speaker recognition process uses a particular background model and a model of the user's speech as its inputs, and compares the relevant voice segment with these models, using a specified verification method to arrive at the output. Features of the user's speech, such as Mel frequency Cepstrum Coefficient (MFCC) features, are obtained from the relevant voice segment, and these features are compared with the features of the background model and the relevant user model. Thus, each speaker recognition process can be considered to comprise the background model, the user model, and the verification method or engine that are used. The speaker recognition processes performed on the first and second voice segments may differ in one or more of these components of the process.

For example, the speaker recognition processes may use the same model of the user's speech (for example, by using just one enrolment session and technique), but may use different verification methods for the first and second voice segments. As one example, the background model and user model may be Hidden Markov Models (HMMs), with the background model being a Universal Background Model (UBM) adapted to human speech, and the user model being adapted to that specific user's speech, but not adapted to any phrase in particular. Then the Text Constrained method used on the trigger phrase may use a forced alignment method to force the HMMs to go through the path indicated by the trigger phrase (a fixed sequence of states in the HMM as defined in the UBM), while the Text Independent system used on the second or command phrase may look for the sequence giving the best alignment without forcing anything. Another example is the case where the UBM and user model are Gaussian Mixture Models (GMMs). The same GMM models can be used in a simple GMM-UBM system that will be fast and low power, for example for the trigger phrase, and then used in a more complex GMM system for example incorporating Factor Analysis, that considers the same speaker models and UBM (and that needs more computational cost and power, but obtains much more accuracy), for the command.

Alternatively, the methods may use different models of the user's speech (also referred to as "user models"), which implies that the methods use different enrolment sessions or processes.

One way to obtain different user models is to have different engines operating on the same set of input audio data during the enrolment process. That is, input audio data is used to form a user model during an enrolment process, as described above. In practice, this is achieved by applying the input audio data to a set of mathematical equations that have certain associated parameters as constants in the equations. Different engines, which may for example be tuned for different purposes, can be obtained by using a different set of equations, including by setting different values for these parameters or by employing a different class of algorithm. For example the input could be a GMM-UBM that goes to an enrolment process to get a user adapted GMM, or to an enrolment process that turns the GMM-UBM into a supervector and builds a Support Vector Machine (SVM) as user model.

Another way to obtain different user models for the speaker recognition processes performed on the first and second voice segments is to use different input data but a common engine during the enrolment process. A third way to obtain different user models for the speaker recognition processes performed on the first and second voice segments is to use different input data during the enrolment process and to use different engines operating on the input data.

When it is desired to obtain different user models for the speaker recognition processes performed on the first and second voice segments by using different input data, one possibility is to use two different audio inputs during the enrolment process to train the respective speaker models. For example, the audio inputs used to form the user model that is used in the speaker recognition process performed on the first voice segment may be audio inputs in which the user speaks the predetermined trigger phrase, so that this becomes a text-constrained speaker recognition process, while the audio inputs used to form the user model that is used in the speaker recognition process performed on the second voice segment may be audio inputs in which the user speaks (or reads aloud) any phrases of their choosing (or a predefined text or set of phrases that is designed to have high phonetic variability), so that this becomes a text-independent speaker recognition process.

A second possibility is to use different background models in order to form the different user models that are used in the speaker recognition processes performed on the first and second voice segments. One specific possibility is to use two different Gaussian Mixture Models (GMMs) as the background models, and hence in the derived user model, by using different numbers of Gaussian components in the models. This may be useful because reducing the number of Gaussian components makes the process faster, while increasing the number of Gaussian components makes the process more accurate.

A third possibility for obtaining the different user models for the speaker recognition processes performed on the first and second voice segments is to use different audio inputs during the enrolment process and to use these to modify respective different background models.

The output of step 58 may for example be a numerical score (in the form of a likelihood ratio, or a distance, or in any other form). This numerical score relating to the second voice segment, which may for example be a command, is denoted here by $s_C$.

In step 60, the results of the speaker recognition processes performed on the first and second voice segments are combined, in order to obtain a combined output result indicating a likelihood that the user is the enrolled user. The combined output result indicative of the likelihood may be for example a log likelihood ratio (LLR) or may be some more indirect indication, for example a metric of distance of extracted features of the speech sample from some one- or multi-dimensional threshold or nominal point or volume in a multi-dimensional speech parameter space.

The combined output result may be obtained from the separate results of the speaker recognition processes performed on the first and second voice segments by any suitable method. For example, the combined output result may be a weighted sum $s_F$ of the results of the speaker recognition processes performed on the first and second voice segments. That is, in general terms:

$$s_F = \alpha s_T + \beta s_C + \gamma$$

The weighting factors $\alpha$, $\beta$, and $\gamma$ may be constant and determined in advance.

Alternatively, the step of combining the results of the speaker recognition processes performed on the first and second voice segments, to obtain a combined output result, may use quality measures to determine how the results should be combined, in order to improve the reliability of the decision. That is, separate quality measures are obtained for the first and second voice segments, and these quality measures are then used as further inputs to the process by which the results are combined.

These quality measures may for example be based on properties of the first and second voice segments, for example the trigger phrase and the command. Certain triggers will be more suitable for use in voice biometrics than others because they are longer in duration, or because they contain more phonetic variability and thus they provide more information to differentiate speakers. Certain commands will be more suitable for use in voice biometrics than others for the same reasons. Other aspects, such as the presence of non-stationary noise in either the first and second voice segments may make one voice segment more reliable than the other.

In one embodiment there is defined a set of quality measures, namely a set of quality measures $Q_T$ for the trigger and a set of quality measures $Q_C$ for the command, and the values of weighting factors $\alpha$, $\beta$, and $\gamma$ are set based on the quality measures. Then a weighted sum $s_F$ will be obtained as a function of these quality measures:

$$s_F = \alpha(Q_T, Q_C)s_T + \beta(Q_T, Q_C)s_C + \gamma(Q_T, Q_C)$$

The functions that map the quality measures $Q_T$, $Q_C$ to the weighting factors $\alpha$, $\beta$, and $\gamma$ are part of the system design and are thus obtained and defined during a development phase, before the system is deployed for user enrolment or verification. The values returned by these functions in use after the development phase will vary from sample to sample as the quality measures $Q_T$, $Q_C$ vary from sample to sample.

The functions may be obtained during the development phase on the basis of exercising the system with a large number of speech samples arranged to have a range of different values of the quality measures.

The form of the functions may be defined before the development phase, and coefficients are optimised to provide the best fit. In some embodiments, the functions may not be algebraic functions but may comprise the form of a look-up table containing optimised coefficients optimised over ranges of value of the quality measures or fixed values applied to optimised ranges of quality measures. More generally a function may be the result of some more complex algorithm characterised by some coefficients and delivering a value dependent on the quality measures.

In some embodiments the combined score may be a non-linear combination of the scores $s_T$ and $s_C$, which may for example be represented in the form $$s_F = \alpha(Q_T, Q_C, s_T)s_T + \beta(Q_T, Q_C, s_C)s_C + \gamma(Q_T, Q_C)$$

where the each weighting factor $\alpha$ or $\beta$ may depend continuously or non-continuously on the respective score.

More generally, the combined score may be any function of the scores, $s_T$ and $s_C$, that are obtained from the speaker recognition processes performed on the first and second voice segments, and of the quality measures, $Q_T$ and $Q_C$, that apply to those voice segments. That is:

$$s_F = f(s_T, s_C, Q_T, Q_C)$$

where f may be any function.

The values of the scores, $s_T$ and $s_C$, and of the quality measures, $Q_T$ and $Q_C$, may be applied to a neural network, which then produces a value for the combined score $s_F$.

When determining the weights to be given to the results of the first and second speaker recognition processes, different quality measures can be considered.

One suitable quality measure is the Signal to Noise Ratio (SNR), which may for example be measured in the input trigger and in the input command separately. In the case of non-stationary noise, where the SNR varies rapidly, a higher weight can be given to the result obtained from the input speech segment that has the higher SNR.

Another suitable quality measure is the net-speech measure. As discussed in connection with the illustrated embodiment, the weight that is given to the score obtained from the command can be increased according to the amount of speech in the command. That is, the total length of the fragments in the command that actually contain speech, excluding non-speech segments, is measured, for example in time units such as seconds, and this is used to form the weight to be applied to the command, relative to the weight applied to the trigger.

A further alternative quality measure is a saturation measure. This determines the amount of the audio input that is saturated, this is, where part of the input audio is beyond the dynamic range of the sensor and the pre-processing stages that process the audio before it reaches the speaker recognition system. This usually happens when the input level is too loud for the system. Saturation is a non-linear effect that generates unexpected harmonics in the signal, and reduces significantly the speaker recognition accuracy since all signals affected by saturation are similar from the speaker recognition point of view, and very distinct from non-saturated signals. Thus, it is possible to measure the amount of audio input that has been saturated in the trigger and in the command. Then, a higher weight is given to the less saturated portion of audio. Saturation can be measured in several ways, but one typical way of measuring it is indicating the percentage of the frames (the number of windows of a certain length, for example 10 ms) that contains saturated audio samples. This percentage is usually calculated over those frames that are labelled as speech by the system (that is, those frames that will be processed by the speaker recognition system).

A further alternative type of quality measure is a measure related to how well the input matches the model, that is, the level of fit between the input and the background models. Universal Background Models (UBM) for speaker recognition are typically statistical models that try to model the universe of inputs that are expected from the universe of speakers. It is expected that the UBM is a good model to describe any input that may be fed into the speaker recognition system. If the UBM is not a close model to an input, we expect the decision of the speaker recognition system to be less reliable, since the input is not similar to anything the system has seen before.

One example of this type of measure is a measure of the likelihood of the data for the text-dependent and text-independent UBM. If one segment of the input has the expected likelihood values (for example those observed on a large development dataset) and the other segment has values below the expected likelihood values, more weight is given to the former system, since it is more capable of describing its input data.

Another example of a quality measure related to how well the input matches the model concerns a divergence between the prior and posterior values of hidden variables. Thus, HMM, GMM and Factor analysis systems use hidden or latent variables in order to explain the input data to the system. When treated in a Bayesian way, there is a prior on these latent variables. Given the input data, a posterior can be obtained. If the divergence between the prior and posterior is large, this means that the input data is not similar to what the model would expect and the system output may not be reliable. This information, measured in both the trigger and the command, can be used to adjust the weights that are given to the results obtained from the speaker recognition processes performed on the trigger and on the command.

A further alternative type of quality measure is a measure provided by an external module of the device that works with the voice biometrics solution.

For example, a measure of this type of may be obtained where the device includes a beamformer. A beamformer may provide measures of the Direct to Reflected Ratio, for each segment of the input signal. If one segment of the input signal (for example the first voice segment that might be the trigger of the second voice segment that might be the command) seems less affected by reverberation or indirect reflections, the system may increase the weight of that segment. This variation may for example happen when the relative positions of the user and the device vary. The system may thus give more weight to a portion of speech according to a measure of a direction from which a respective portion of speech was received, in order to weight more heavily a signal portion more directly received from the user. Somewhat similarly, a beamformer may provide measures of the Signal to Interference ratio of the received signals. Then, when there is more than one source of sounds (for example the desired speaker and some directional noise or other interfering speakers), the system can give more weight to the segments that are less affected by the interferers.

A further measure of this type may be obtained where the device includes a proximity sensor. For example, a proximity sensor can determine how far the user was from the microphone when speaking the first and second voice segments, i.e. the range from which the respective portion of the received signal was received. This information can be used to give more weight to the speaker recognition results obtained on voice segments that were uttered from a shorter distance.

During the verification phase, in one embodiment the method may detect the start and the end of the trigger and of the command, and then extract the quality measures and the scores for the trigger and the command, using the corresponding background models and user models obtained during enrolment, and these background models and/or user models may be for the trigger and the command. The quality measures are used to determine the weighting factors, based on the functions learnt during the development stage. Then the weighting factors are used to obtained a combined result from the separate results obtained by performing the first and second speaker recognition processes on the trigger phrase and the command respectively.

Particularly, in one embodiment, the weighting factors $\alpha$, $\beta$ and $\gamma$ may be determined based on the particular trigger phrase considered and the amount of user speech available in the command, $n_C$. For this purpose, a development phase is needed.

During the development phase, optimal values are obtained for the weighting factors $\alpha$, $\beta$, $\gamma$ are obtained for different lengths of net-speech $n_C$ (that is, the amount of actual user speech) in the command, considering always the same trigger phrase. Once the trigger is fixed, the optimal weighting factors for a given value of $n_C$, that is $\alpha(n_C)$, $\beta(n_C)$, $\gamma(n_C)$ may be selected according to certain criteria. For example, Linear Logistic Regression can be used to determine the optimal values of the weighting factors.

Linear Logistic Regression applies Logistic Regression to the linear combination of the scores to obtain the combined score $s_F$, thus:

$$s_F = \alpha(n_C)s_T + \beta(n_C)s_C + \gamma(n_C)$$

The Logistic Regression tries to determine the true value that the decision $\theta$ of the system should take ($\theta=1$ for hypothesis $H_1$, that is a match, and θ=0 for hypothesis $H_2$, that is no-match) from the score through the logistic function:

$$P(H_1 \mid s_T, s_C, n_C) = \frac{1}{1 + \varepsilon^{-(\alpha(n_C)s_T + \beta(n_C)s_C + \gamma(n_C))}}$$

The output of the Logistic Function can be interpreted as the probability that the input segment is a match to the speaker model, given the scores for the trigger and the command, and the net-speech length of the command. Note that, in a Bayesian framework, this is only true for a flat prior, that is $P(H_1)=P(H_2)=0.5$. However, for different priors, it is still possible to include prior information in the Logistic Function.

Figure 4:
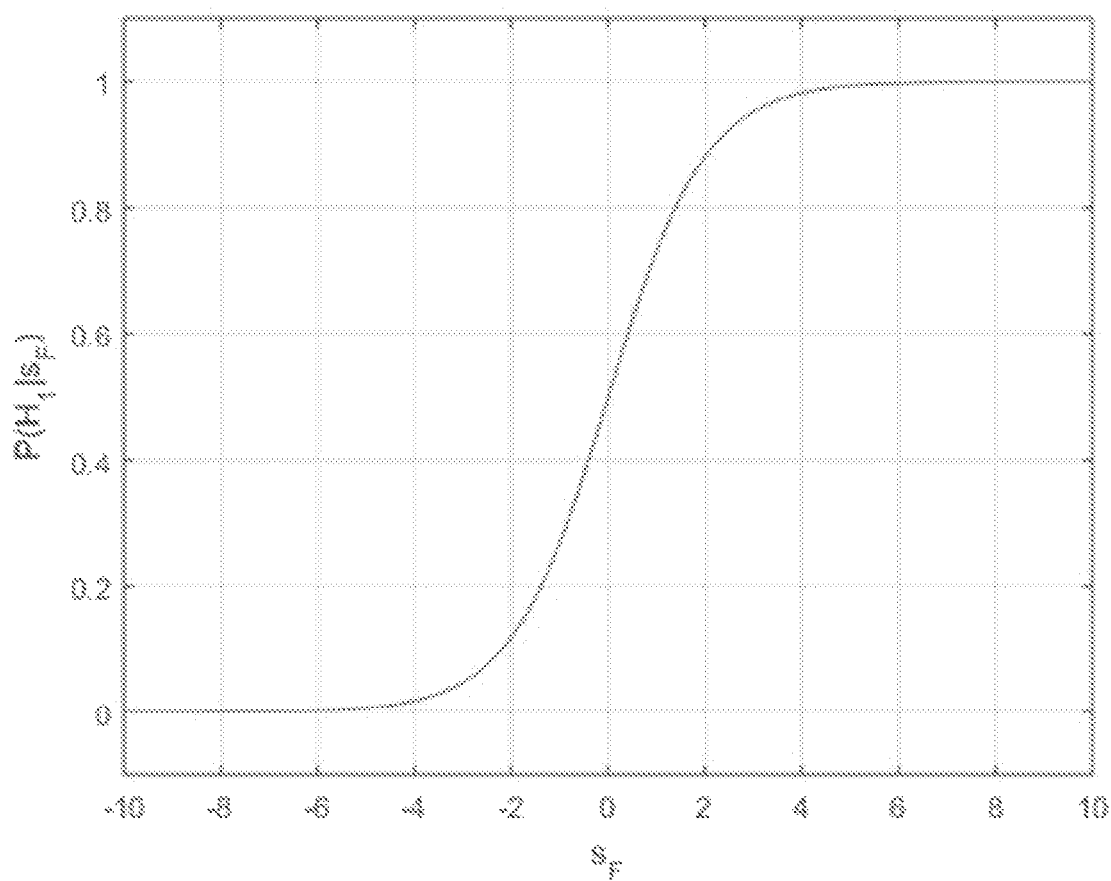
FIG. 4 is a plot illustrating a step in the method.

FIG. 4 shows how this sigmoid function $P(H_1|s_F)$, that is $P(H_1|s_T, s_C, n_C)$, asymptotically approaches 1 or 0 as the combined score $s_F$ increases or decreases.

Thus:
in the limit, as $(s_F \to -\infty)$, $P(H_1|s_F)=0$ and
in the limit, as $(s_F \to \infty)$, $P(H_1|s_F)=1$.

Scaling or biasing the inputs to this function (as altering the weighting factors will in general do), will shape the sigmoid accordingly. Specifically, changing the weighting factors $\alpha(n_C)$ and $\beta(n_C)$ will shape the function so that the slope will be more or less steep, and changing the bias weighting factor $\gamma(n_C)$ will move the function along the horizontal axis.

In order to determine the optimal values for the weighting factors, or fusion coefficients, the development process needs, as training data, a large number (for example in the thousands) of samples of scores of the text-constrained and text-independent speaker recognition systems for a particular $n_C$ and trigger phrase, and the decisions associated with these scores. Every training sample i is a set of values $\{s_T, s_C, n_C, \theta\}_i$, where θ=1 for a match, and θ=0 for a no-match. This set has been extracted from an actual user interaction with the VUI. Then Linear Logistic Regression determines the optimal set of coefficient values that best predicts the true value of θ with $P(H_1|s_T, s_C, n_C)$.

Specifically, this is achieved by minimizing the cross-entropy between the true underlying distribution of the output decision P(θ) (observed decisions) and the model $P(H_1|s_T, s_C, n_C)$. Note that the cross-entropy minimization process does not set any constraint in the fusion weights, and so their values are not bounded.

This process is done for several $n_C$ values, so that a set of fusion coefficients is obtained for each $n_C$. In practice, it is more useful to agglomerate the samples that have similar values for $n_C$, rather than those that have exactly the same value of $n_C$. For this purpose, K intervals of $n_C$ values can be defined, and the input samples can be pre-classified according to the interval that their $n_C$ falls into.

Figure 5:
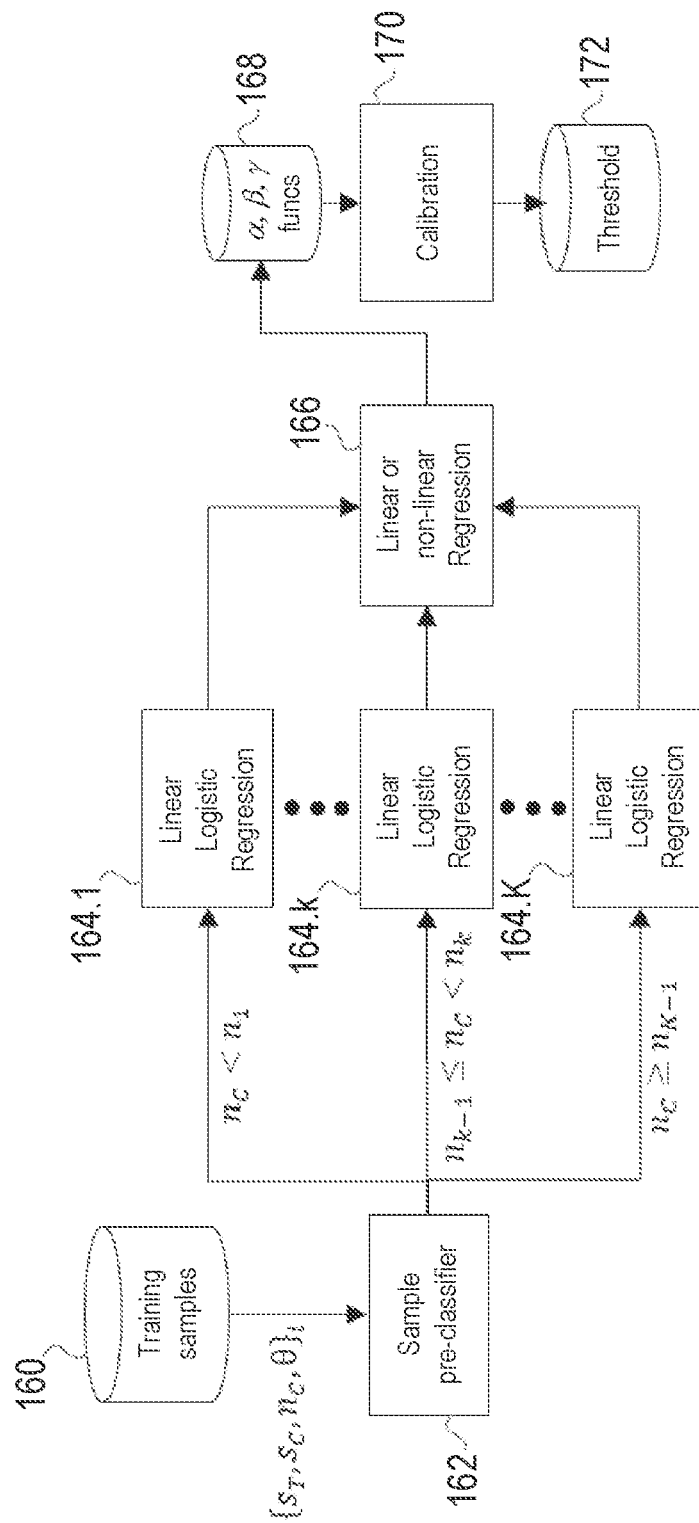
FIG. 5 is a schematic diagram illustrating a step in the method.

FIG. 5 illustrates this development process. As mentioned above, there are a large number of training samples 160, and these are passed to a pre-classifier 162, where they are classified based on the interval that their value of $n_C$ falls into. Thus, (K-1) thresholds are defined, and for values of $n_C$ that are less than a first threshold $n_1$, the samples are passed to a first linear logistic regression block 164.1; for values of $n_C$ that are less than a first threshold $n_k$, but greater than the previous threshold $n_{k-1}$, the samples are passed to a $k^{th}$ linear logistic regression block 164.k; and for values of $n_C$ that are greater than the last threshold $n_{K-1}$, the samples are passed to a $K^{th}$ linear logistic regression block 164.K.

Then, as shown at 166, a function is carried out, designed to map every value of $n_C$, including those seen and not seen during development, to obtain the corresponding fusion coefficients 168. Finally, a calibration operation 170 is performed, so that the threshold 172 is adjusted to the desired operating point. Although this step can alternatively be included in the Linear Logistic Regression, this separate calibration enables the setting of constraints to the fusion weight values, facilitating their modelling.

A simple non-linear mapping using step functions could be considered, so that for each interval of $n_C$ values considered for pre-classification, a set of fusion coefficients is defined as follows:

$\{\alpha(n_C), \beta(n_C), \gamma(n_C)\} = \{\alpha_1, \beta_1, \gamma_1\}\ n_C < n_1$ $\{\alpha(n_C), \beta(n_C), \gamma(n_C)\} = \{\alpha_k, \beta_k, \gamma_k\}\ n_{(k-1)} \leq n_C < n_k$ $\{\alpha(n_C), \beta(n_C), \gamma(n_C)\} = \{\alpha_K, \beta_K, \gamma_K\}\ n_{(K-1)} \leq n_C$ An example of this piece-wise constant mapping is presented in the table below, where six intervals have been defined, noting that $n_C=0$ is a special case, in which there is no command.

| $n_C$ | $\alpha(n_C)$ | $\beta(n_C)$ | $\gamma(n_C)$ |
| --- | --- | --- | --- |
| 0 | 1.00 | 0.00 | 0.00 |
| 0 < $n_C$ < 1 | 2.89 | 1.50 | 8.87 |
| 1 < $n_C$ < 2 | 2.83 | 2.07 | 10.24 |
| 2 < $n_C$ < 3 | 2.76 | 2.45 | 11.17 |
| 3 < $n_C$ < 5 | 2.73 | 2.62 | 11.82 |
| 5 < $n_C$ < 10 | 2.71 | 2.80 | 12.38 |
| 10 < $n_C$ | 2.75 | 3.18 | 13.85 |

A regression model can be used for the mapping as well. The use of a regression model to estimate the fusion weights from the net-speech is more natural, since net-speech is a continuous variable rather than a discrete one.

The fusion weights obtained from Logistic Regression do not have any constraint, and so regression models may not fit very well. The weights may therefore be scaled and biased in such a way as to obtain a better fit.

Figure 6:
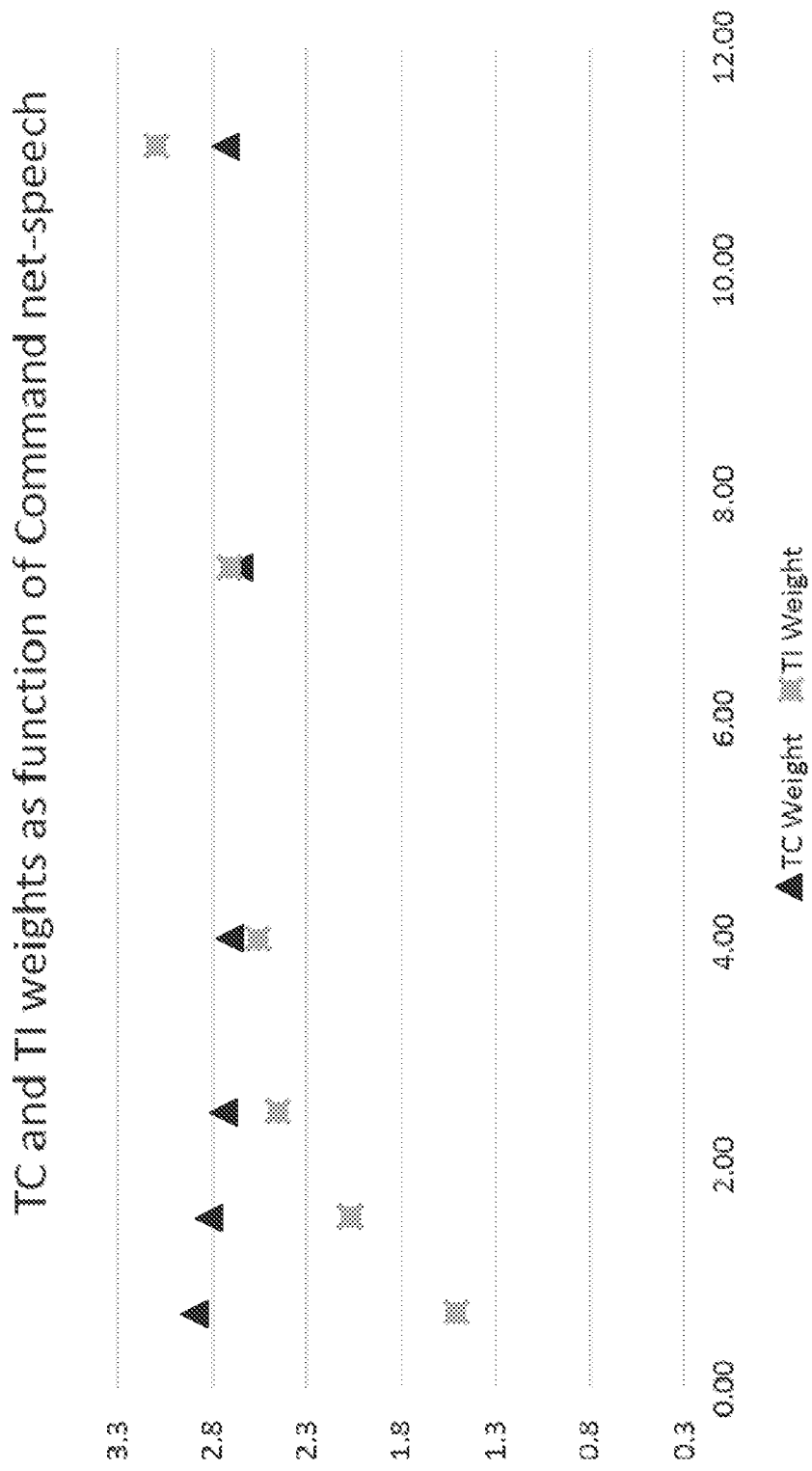
FIG. 6 is a plot illustrating a step in the method.

FIG. 6 is a plot of the values in the table above, showing the weights applied to the score obtained from the text-constrained (TC) speaker recognition process (i.e. the weight $\alpha(n_C)$ applied to the score obtained from the command) and to the score obtained from the text-independent (TI) speaker recognition process (i.e. the weight $\beta(n_C)$ applied to the score obtained from the trigger), for the six ranges of values of the net-speech present in the command (i.e. $n_C$). For each of these ranges, the scores are shown at the average value of the net-speech for all of the inputs in the respective range for the particular set of samples actually used to generate these weight values.

As would be expected, the weight applied to the score obtained from the command increases relative to the weight applied to the score obtained from the trigger, as the amount of net-speech present in the command increases.

To facilitate the task of building a regression model in step 166 of FIG. 5, it is possible to set a constraint to the weights. The offset term $\gamma(n_C)$ in the fusion weights translates into a movement of the threshold that is used to distinguish between a match condition and a no-match condition. Since a calibration stage (shown at 170 in FIG. 5) is used to set the desired threshold, this offset term is not needed.

Also, the scale of the fusion weights $\alpha(n_C)$, $\beta(n_C)$ is only important for calibration, as far as the relationship $\alpha(n_C)/\beta(n_C)$ is maintained. Therefore, ignoring the scale of $\alpha(n_C)$ and $\beta(n_C)$ and ignoring the offset term $\gamma(n_C)$, it is possible to set a constraint for the weights, namely:

$$\alpha(n_C)+\beta(n_C)=1$$

Figure 7:
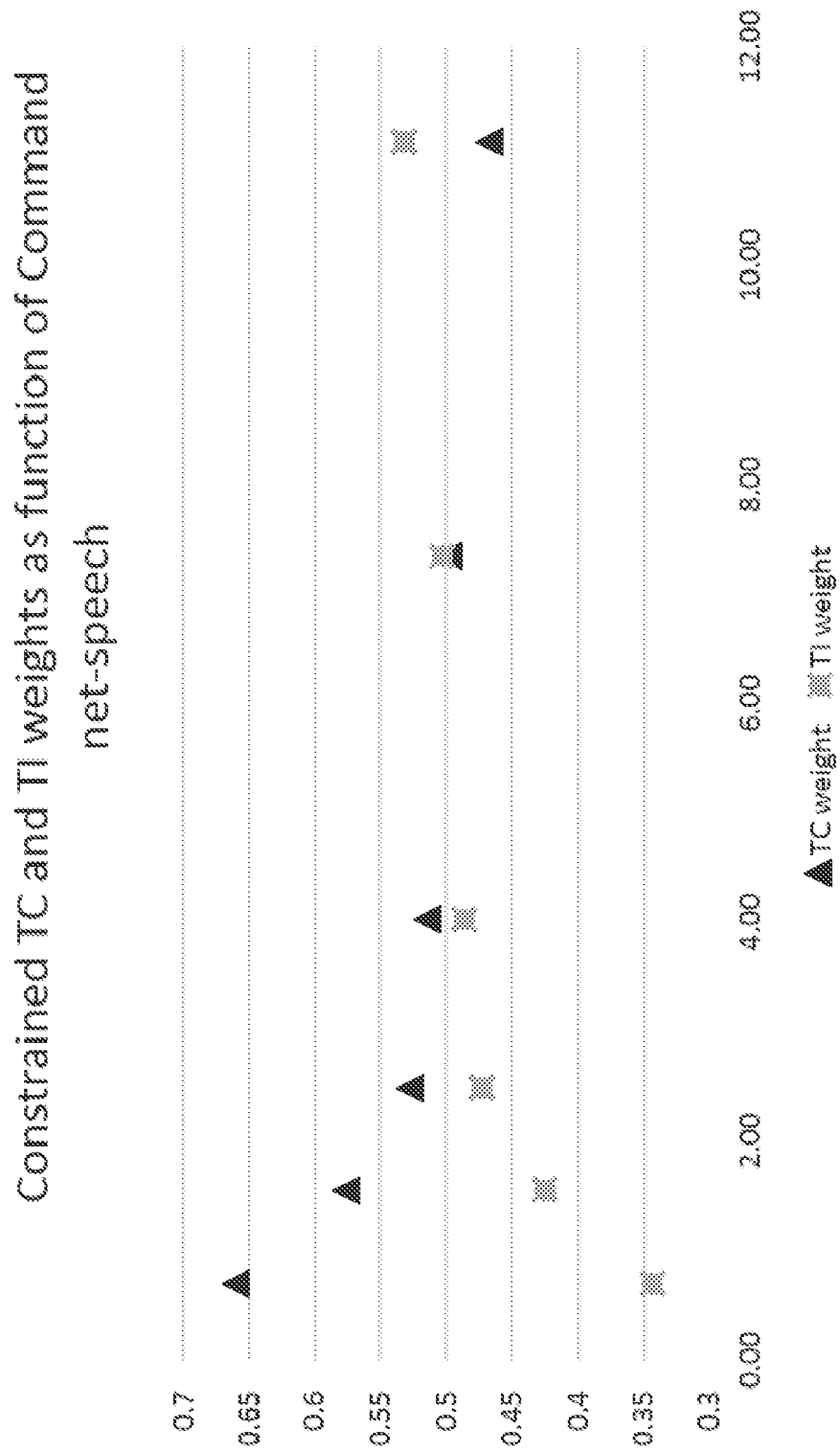
FIG. 7 is a plot illustrating a step in the method.

FIG. 7 is another plot of the values from the table above, showing the weights applied to the score obtained from the text-constrained (TC) speaker recognition process (i.e. $\alpha(n_C)$) and to the score obtained from the text-independent (TI) speaker recognition process (i.e. $\beta(n_C)$), for the six ranges of values of the net-speech present in the command (i.e. $n_C$), after applying the constraint that $\alpha(n_C)+\beta(n_C)=1$, while maintaining the ratio $\alpha(n_C)/\beta(n_C)$.

This constraint makes the values of $\alpha(n_C)$ and $\beta(n_C)$ more reasonable, since the tendency to increase of one translates in the tendency to decrease of the other, avoiding ranges of $n_C$ where both increase or decrease, which make difficult modelling these weights.

It is possible to use a regression model for the ratio $\alpha(n_C)/\beta(n_C)$, rather than for each weight separately. In one embodiment, a linear regression model is used to estimate the ratio $\alpha(n_C)/\beta(n_C)$ for any given value of $n_C$. In fact, a specific embodiment, uses a model that is linear with respect to $n_C^{-1}$, since we expect asymptotic behaviour for very large values of $n_C$. Thus, values of parameters a and b are obtained that provide the best fit to a line of the form:

$$\alpha(n_C)/\beta(n_C)=a \cdot n_C^{-1}+b$$

Figure 8:
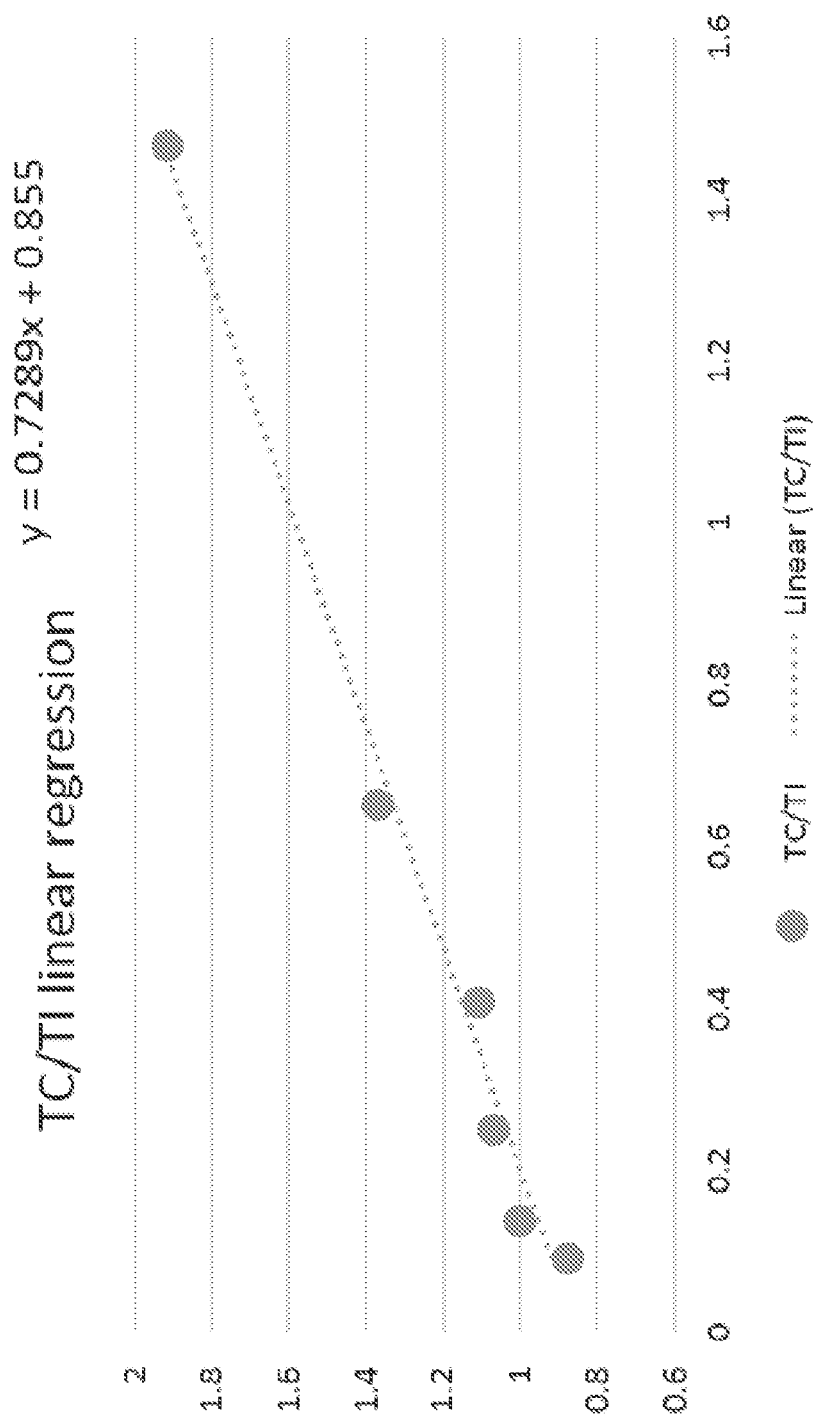
FIG. 8 is a plot illustrating a further step in the method.

FIG. 8 is a plot of the values from the table above, converted into the form required by this regression equation. That is, for each of the ranges of values of $n_C$ for which values of $\alpha(n_C)$ and $\beta(n_C)$ were obtained, the average value of the ratio $\alpha(n_C)/\beta(n_C)$ is plotted against $n_C^{-1}$, the reciprocal of the average value of the net-speech for all of the inputs in the respective range Then, a best-fit straight line is found, which in this case gives values of parameters a=0.7289 and b=0.855, and therefore:

$$\alpha(n_C)/\beta(n_C)=0.7289 \cdot n_C^{-1}+0.855.$$

In this illustrated case, the values were obtained for a particular set of triggers. In one alternative, separate values can be obtained for each trigger, and the regression can be performed separately for each trigger, leading to different terms in the regression for each trigger.

Then, for any future input values of $n_C$ that are obtained from received voice commands, the linear model can be used to find a value for the ratio $\alpha(n_C)/\beta(n_C)$, and then values for the separate fusion weights $\alpha(n_C)$ and $\beta(n_C)$ can be calculated using the constraint that $\alpha(n_C)+\beta(n_C)=1$.

As an alternative to this linear regression technique, a non-linear regression technique, for example as the map to a step function such as that previously presented, or a more complex non-linear function, could be used.

As a further alternative to the process described above, the values of $n_C$ could be included directly in the Linear Logistic Regression process, avoiding the need for performing a pre-classification. In this case, the Logistic Function $\sigma(\ )$ is applied to $n_C$ before inputting it to the Linear Logistic Regression, so that $\sigma(c \cdot n_C+d)$ takes values between 0 and 1, and these values are used to weight the input samples, for the Linear Logistic Regression. The output model of the logistic regression then is capable of providing the fusion coefficients for any input value $n_C$. This is known as using "side information" in the Linear Logistic Regression. This also eliminates the need for a final calibration stage, although in practice it may be preferable to perform a final calibration to obtain the threshold value.

In addition to the determination of the fusion coefficients, during development, the text-constrained speaker recognition system may be adapted to the trigger phrase using some or all of the same samples of the trigger phrase.

In addition, or alternatively, the trigger detection system may be adapted to the trigger phrase.

During enrolment, the user may provide samples of the same trigger phrase used in development for creating the user voiceprint for the text-constrained voice biometrics system, and may also provide text-independent samples for creating the user voiceprint for the text-independent voice biometrics system. The samples of the trigger phrase may also be used to adapt and tune the trigger detector.

So far, it has been assumed that the text-constrained and text-independent voice biometrics engines that operate on the first and second voice segments operate independently. However, they may share information to provide more robust responses. For example, in an embodiment in which the engines that operate on the first and second voice segments are identical, except for the background models that they use, the text-independent engine operating on the second voice segment may use partial or complete information from the first voice segment (i.e. the trigger) to obtain a more accurate score So far, it has been implied that the text-constrained and text-independent voice biometrics engines operate on first and second voice segments which are non-overlapping. However in some embodiments it may be advantageous to operate the later check on a second voice segment which comprises some or all of the first voice segment, i.e. the two voice segments analysed are overlapping rather than non-overlapping. For instance, the first voice segment may be analysed using a relatively fast and simple speaker recognition engine, whereas the second voice segment may be analysed using a more complex but more reliable speaker recognition algorithm, and the result of the latter may be made even more reliable by increasing the effective length of the sample analysed. Thus in some embodiments the first and second voice segments may be different but overlapping.

In some embodiments a further authentication process may be performed in parallel with the trigger or command speaker authentication, and the corresponding authentication results may be combined in a similar fashion to the above.

This parallel authentication process may be an authentication process based on different characteristics of speech, for example a time-domain based method. In some embodiments the parallel authentication process may be one sensitive to spectral or other characteristics symptomatic of an attempt to spoof the system by playback or direct injection techniques, i.e. be an antispoofing technique.

An exemplary antispoofing technique is based on computing a likelihood ratio (LR). It is extracted from a feature vector, y computed from the testing signal, and two Gaussian models $N(y; \mu_{(non-)spoof}, \Sigma_{(non-)spoof})$, one that represents non-spoof data and other that represents spoof data:

$$LR = \frac{N\left(y; \mu_{spoof}, \sum_{spoof}\right)}{N\left(y; \mu_{non-spoof}, \sum_{non-spoof}\right)} \quad (1)$$

where $\mu_{spoof}$ and $\Sigma_{spoof}$ are the mean vector and the diagonal covariance matrix for the spoof model, and $\mu_{non-spoof}$ and $\Sigma_{non-spoof}$ are the mean vector and the diagonal covariance matrix for the non-spoof model, which are typically also speaker dependent and they are typically obtained during enrolment.

The antispoofing feature vector is composed of different metrics, for example by the spectral ratio, low frequency ratio and feature vector squared Mahalanobis distance. In this example, $N_{AS}=3$. Alternatively other metrics could also be included or one or two of the metrics may be replaced by other metrics or omitted entirely.

The spectral ratio may for example be the ratio between the signal energy from 0 to 2 kHz and from 2 kHz to 4 kHz. Thus, given a frame l of the audio access x(n), the spectral ratio may be calculated as:

$$SR(l) = \sum_{f=0}^{\frac{NFFT}{2}-1} 20\log_{10}(|X(f,l)|)\sqrt{\frac{4}{NFFT}}\cos\left(\frac{(2f+1)\pi}{NFFT}\right) \quad (2)$$

where X(f,l) is the Fast Fourier Transform (FFT) value of the frame l and the f frequency bin of the audio signal, and NFFT is the number of points of FFT (256 samples, for example).

After computing eq. (2) for all the frames, the average value of the spectral ratios ($SR_{audio}$) may be calculated as the mean of the spectral ratios of the frames whose modulation index is above a given threshold (for example 0.75). Frames with a modulation index above a given threshold usually correspond to speech signals, such that typically by calculating the mean of the spectral ratios of frames with a modulation index above a given threshold results in calculating the mean describing the parts of the audio signal comprising speech. The frames can be created from the audio signal using a window length of 20 msec. with shift of 10 msec, for example.

The low frequency ratio may e.g. be computed as the ratio between the signal energy from 100 Hz to 300 Hz and from 300 Hz to 500 Hz. Given a frame l, it may be calculated as:

$$LFR(l) = \sum_{f=100Hz}^{300Hz} 20\log_m(|X(f,l)|) - \sum_{f=300Hz}^{500Hz} 20\log_{10}(|X(f,l)|). \quad (3)$$

After computing eq. (3) for all the frames, the average value of the spectral ratios ($LFR_{audio}$) may be calculated as the mean of the low frequency ratios of the frames whose modulation index is above a given threshold (for example 0.75). The frames can be created using a window length of 20 msec. with shift of 10 msec, for example.

Finally, the feature vector squared Mahalanobis distance may be computed between the average MFCC vectors (e.g. with dimension $N_{AS-MFCC}$) along the time obtained from the speaker recognition testing signal received in the audio access(es), and the one observed during enrolment. A standard deviation diagonal matrix is typically also required to compute the distance (which is typically computed during or after enrolment).

A standard deviation diagonal matrix may e.g. be computed as disclosed in the European patent application EP-2860706A. An alternative, improved way of using the result of an Antispoofing process is described here. In this example, the voice first and second segments, which may be the trigger and the command as discussed previously, are subject to separate antispoofing detection processes (which may be the same or different), to obtain two antispoofing output scores, one for the trigger and one for the command.

These scores may then be integrated with the speaker recognition scores.

One way of using the antispoofing output scores is to use them as a filter.

In this case, where we have two different antispoofing scores (one for the trigger $r_T$ and one for the command $r_C$), the system may reject the user when one of them is over a very high threshold ($r_T > \epsilon_{TH}$ OR $r_C > \epsilon_{CH}$), suggesting that it is very likely that the input trigger or command is a spoof. The system may also reject the user if both the trigger and the command antispoofing scores are over certain lower threshold ($r_T > \epsilon_{TL}$ AND $r_C > \epsilon_{CL}$, with $\epsilon_{TH} > \epsilon_{TL}$ and $\epsilon_{CH} > \epsilon_{CL}$).

An alternative would be to apply the same fusion method described in this application for speaker recognition to fuse the antispoofing scores and reject the user if the resulting score $r_F$ is over a certain threshold:

$$r_F = \alpha_{AS} \cdot r_T + \beta_{AS} \cdot r_C + \gamma_{AS}.$$

Note that, in this case, the fusion weights will not be the same as those obtained for speaker recognition, but they can be obtained as function of quality measures, in the same way as explained for speaker recognition.

A further option is to use the antispoofing scores as a quality measure in the speaker recognition process described previously. In this case the fusion weights for speaker recognition will be modified according to the antispoofing output for the trigger and the command. The antispoofing scores are thus used in a similar manner to the net-speech in the previously-described embodiment, or as we would use any other quality measure. In general it is a good idea to combine this approach with the use of the antispoofing output scores as a filter, so that, if the input is clearly a spoof it is directly rejected instead of using the antispoofing scores only to modify the weights.

A third option is to use the antispoofing scores as additional scores for the speaker recognition task, and fuse them with the speaker recognition scores. This approach is advantageous if we expect there to be correlation between the speaker recognition and antispoofing scores. In this case, before fusing the speaker recognition scores for the trigger and the command, we fuse the trigger speaker recognition and antispoofing scores, and we fuse the command speaker recognition and antispoofing scores, obtained as output of one or more speaker recognition systems and one or more antispoofing systems (for simplicity the equations below are presented considering only one speaker recognition system and one antispoofing system for trigger and one speaker recognition system and one antispoofing system for the command), so that the new scores for trigger and the command are:

$$p_T = f_T(s_T, r_T)$$

$$p_C = f_C(s_C, r_C)$$

The trigger and command fusion functions may be identical or different, and they may be a linear fusion, which in general is the most reasonable approach when the inputs are assumed to be uncorrelated, or any other fusion method. Particularly, the trigger and command fusion score could be obtained using a classifier that is capable of modelling the correlations that may appear between the multiple speaker recognition and anti-spoofing scores. To do so, for each trigger input or command input, a score vector can be built using each score as an entry of the vector, for example for the trigger and the case of having one speaker recognition and one anti-spoofing score:

$$\begin{bmatrix} s_T \\ r_T \end{bmatrix}.$$

For N scores, this vector is a point in an N dimensional space. Using several thousand of samples as development data, a classifier can be trained to properly classify the input vectors of scores into the two classes of interest: user (so the output of the system should be a match) or impostor/spoof. This classifier may be a Gaussian classifier with two classes (this is sometimes known as Gaussian Back End), or may use more complicated models, as GMMs. It also may be a SVM or other type of classifier.

In general the classifier will output a new score on how likely is the input vector of scores to belong to the class of the user, or ultimately, the input to be a match. This score may be again in the form of a likelihood ratio, a distance or something else, and this score will be used directly used as $p_T$ (in the case of the trigger) for the later fusion of trigger and command.

Exactly the same process would be applied for the command, using $$\begin{bmatrix} s_C \\ r_C \end{bmatrix}$$

as the score vector and obtaining $p_C$. Note that the score vectors considered for the command may contain the same number of scores as the score vectors for the trigger, or a different number of scores (i.e., antispoofing may be used for the trigger only, or a different number of speaker recognition systems and anti-spoofing systems may be used for the trigger and the command).

This third option can also be combined with the use of the antispoofing output scores as a filter, as described above.

The use of the antispoofing scores as a quality measure can also be combined with the use of the antispoofing scores as additional scores for the speaker recognition task, particularly if the systems that are used to obtain quality measures are not considered for obtaining the scores $p_T$ and $p_C$, and vice-versa.

Thus, various embodiments have been described above, for arriving at a combined result of the speaker recognition. In step 62, it is determined based on this combined result whether the user is authenticated. For example, it may be determined that the user is authenticated if the combined result obtained as a function of the separate results exceeds a threshold value.

Figure 9:
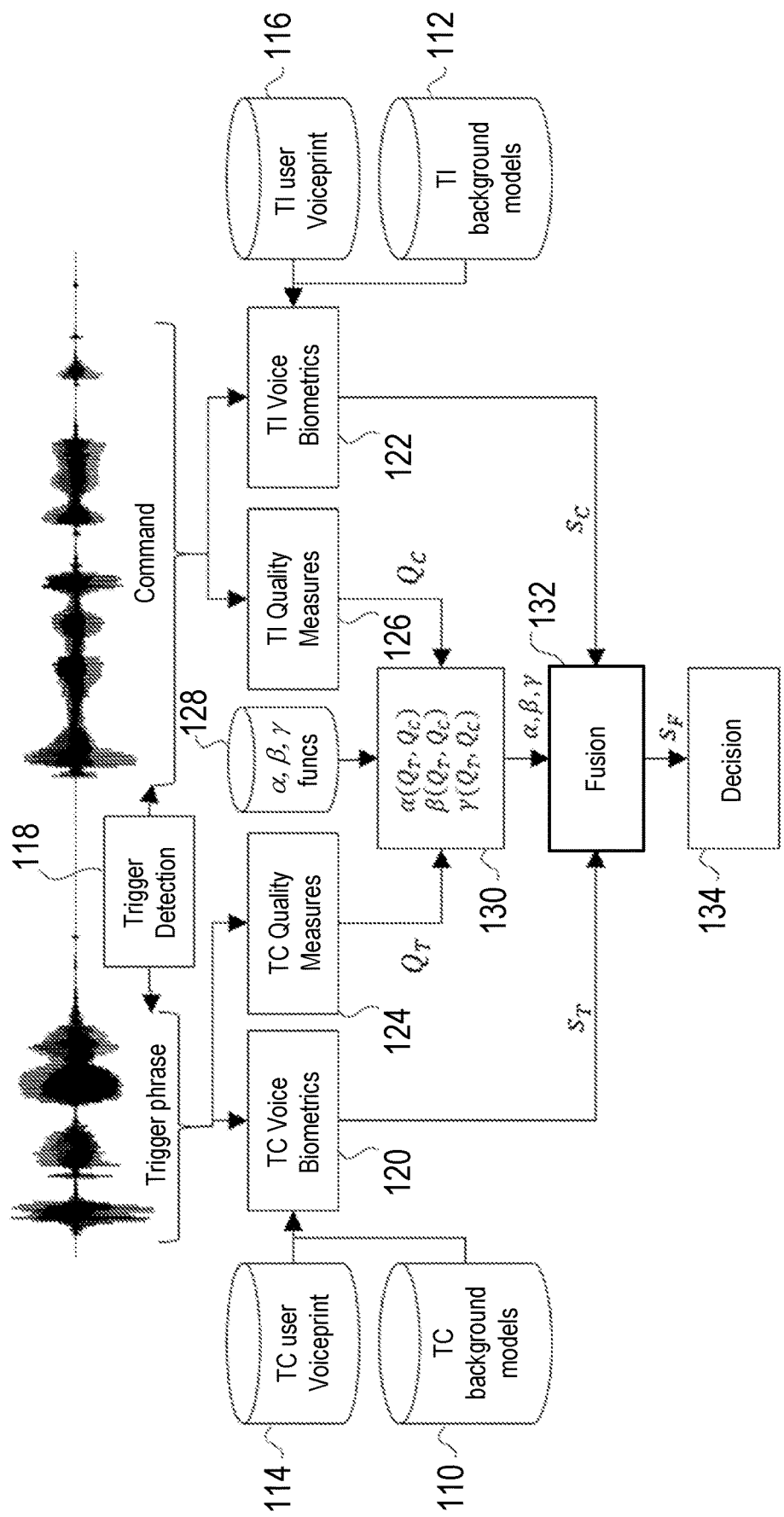
FIG. 9 is a schematic diagram illustrating a first method.

FIG. 9 is a schematic diagram, illustrating a first embodiment of the authentication process that is generally as described above.

Thus, a first background model 110 for use in a text-constrained (TC) speaker recognition process and a second background model 112 for use in a text-independent (TI) speaker recognition process are taken as starting points. During an initial enrolment, user speech samples are used to form a text-constrained user voiceprint (that is, the set of coefficients that define the user model) 114 and a text-independent user voiceprint 116.

A trigger detection block 118 detects that a trigger phrase has been spoken and a text-constrained speaker recognition or voice biometrics process 120 is performed, based on the first voice segment (namely the user speech from the trigger phrase), the first background model 110, and the text-constrained user voiceprint 114, to produce a score $s_T$. Also, a text-independent speaker recognition or voice biometrics process 122 is performed, based on the second voice segment (namely the user speech received after the trigger phrase, which is expected to be a command), the second background model 112, and the text-independent user voiceprint 116, to produce a score $s_C$.

A first set of quality measures ($Q_T$) 124 is obtained from the first voice segment, and a second set of quality measures ($Q_C$) 126 is obtained from the second voice segment.

The functions that map the quality measures $Q_T$, $Q_C$ to the weighting factors $\alpha$, $\beta$, and $\gamma$ have been obtained during a development phase and are stored at 128. Thus, the values of the quality measures $Q_T$, $Q_C$ are used to obtain values of the weighting factors $\alpha(Q_T, Q_C)$, $\beta(Q_T, Q_C)$, and $\gamma(Q_T, Q_C)$ as shown at 130.

The values of the weighting factors $\alpha(Q_T, Q_C)$, $\beta(Q_T, Q_C)$, and $\gamma(Q_T, Q_C)$ are then used to determine how to fuse the scores $s_T$, $s_C$, as shown at 132. This fused score can be used to make a decision, as shown at 134, as to whether the first and second voice segments were obtained from the registered user.

Figure 10:
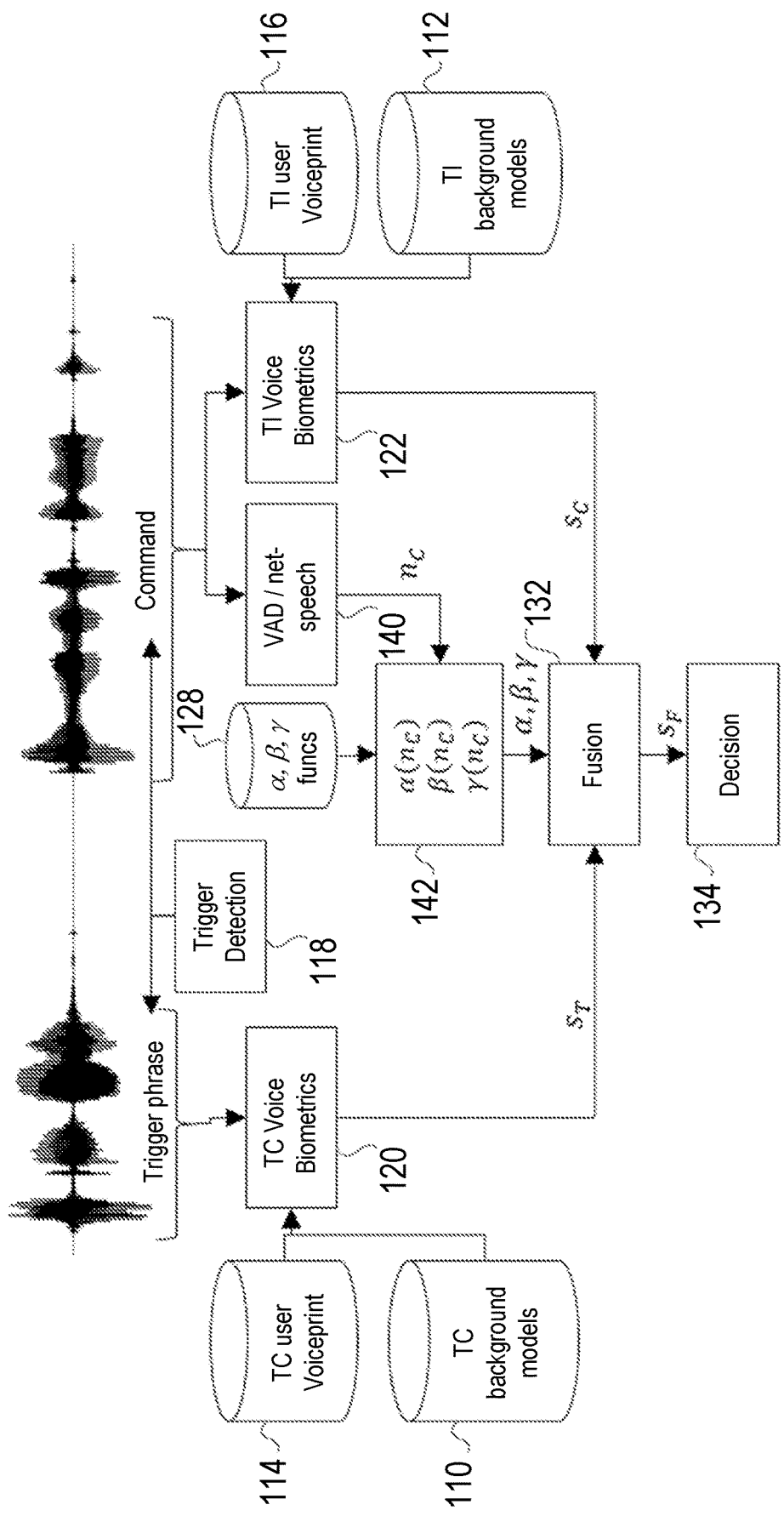
FIG. 10 is a schematic diagram illustrating a second method.

FIG. 10 is a schematic diagram, illustrating a second embodiment of the authentication process that is generally as described above. Features that are the same as features of the process shown in FIG. 9 are indicated by the same reference numerals.

Thus, a first background model 110 for use in a text-constrained (TC) speaker recognition process and a second background model 112 for use in a text-independent (TI) speaker recognition process are taken as starting points. During an initial enrolment, user speech samples are used to form a text-constrained user voiceprint (that is, the set of coefficients that define the user model) 114 and a text-independent user voiceprint 116.

A trigger detection block 118 detects that a trigger phrase has been spoken and a text-constrained speaker recognition or voice biometrics process 120 is performed, based on the first voice segment (namely the user speech from the trigger phrase), the first background model 110, and the text-constrained user voiceprint 114, to produce a score $s_T$. Also, a text-independent speaker recognition or voice biometrics process 122 is performed, based on the second voice segment (namely the user speech received after the trigger phrase, which is expected to be a command), the second background model 112, and the text-independent user voiceprint 116, to produce a score $s_C$.

A voice activity detector 140 is used to obtain a measure of the net speech $n_C$ contained in the second voice segment.

The functions that map the quality measures $Q_T$, $Q_C$ to the weighting factors $\alpha$, $\beta$, and $\gamma$ have been obtained during a development phase and are stored at 128. Thus, the values of the net speech factor $n_C$ is used to obtain values of the weighting factors $\alpha(n_C)$, $\beta(n_C)$, and $\gamma(n_C)$ as shown at 142.

The values of the weighting factors $\alpha(n_C)$, $\beta(n)$, and $\gamma(n_C)$ are then used to determine how to fuse the scores $s_T$, $s_C$, as shown at 132. This fused score can be used to make a decision, as shown at 134 in FIG. 10, as to whether the first and second voice segments were obtained from the registered user.

The decision illustrated as 134 in FIG. 10 is equivalent to the decision shown as 62 in FIG. 3. This authentication result from this block 62 can then be used for any desired purpose. For example, the result may be passed to a further decision block 64, to be discussed in more detail below. More generally, if the user is authenticated, a decision may be made to accept that the user is the registered user of the device, as shown at step 74, and this decision may for instance prompt some physical feedback to the user, for example audible, visual or haptic feedback, or some other default action that may occur without further speech input from the user, or allow a response some other input from the user, for instance via a keyboard, to execute some command.

In the example shown in FIG. 3, if the user is not authenticated based on the combined result, the process passes to step 68. In this example, if the voice biometric input is not considered sufficient to authorise the user, a second authentication factor is requested. For example, the user may be asked to enter a PIN number or password through a keypad of the device, or to provide additional biometric authentication, such as a fingerprint scan.

In step 68, it is determined based on this second authentication factor whether the user is authenticated. This authentication result can then be used for any desired purpose. For example, the result may be passed to a further decision block 70, to be discussed in more detail below. More generally, if the user is authenticated, a decision may be made to accept that the user is the registered user of the device, as shown at step 74 as discussed above.

In the example shown in FIG. 3, if the user is not authenticated based on the second authentication factor, the process passes to step 72, and the user is rejected. The form that this rejection will take will depend on the action that the user was trying to perform.

The decision to accept or reject the user will therefore have a high degree of reliability, because it takes account of more of the user's speech, compared with a system in which the authentication is performed based only on the trigger phrase.

The example shown in FIG. 3 relates to a situation in which the user is attempting to send a speech command to the device, in order to control an aspect of the operation of the device.

Thus, it is expected that the second voice segment, received in step 56, is a command uttered by the user. In step 76, a speech recognition process is performed on the second voice segment. In some embodiments, this may be achieved by transmitting data representing the speech to a speech recognition engine located remotely from the device (for example, in the cloud), using the interface 30 of the device 10. In other embodiments, the speech recognition process is performed in the device 10. The speech recognition process obtains the content and meaning of the second voice segment.

In step 78 of this example embodiment, it is determined whether the command is such that it requires authentication. This determination may be made on the basis of a predefined list of commands requiring authentication or not requiring authentication, or it may be made on the basis of data or processing modules requested by the command. For example, if the spoken command asks for publicly available information, it may be determined at step 78 that no authentication is required, and hence the process passes to step 80, in which the content of the command may be used to generate a query to an internet search engine in order to be able to supply that information to the user.

However, in other cases, for example if the spoken command relates to personal information, it may be determined at step 78 that authentication is required. In that case, the process passes to step 64, in which it is determined whether the user has been authenticated based on the results of the speaker recognition process. If the user has not been authenticated, the process passes to step 70, in which it is determined whether the user has been authenticated, based on the combination of the speaker recognition process and the second authentication factor, as described above.

If the user has not been authenticated, the process passes to step 72, and that command is rejected. If the user has been authenticated, the process passes to step 80, and the command is executed.

The decision to execute the command, or not to execute the command, may be communicated to the user, for example by providing audible, visual or haptic feedback to the user.

In the example shown in FIG. 3, the process of authentication and the process of speech recognition are performed in parallel, in order to save time.

However, in other examples, these processes may be performed sequentially, with the performance of one possibly being conditional on the result of the other.

For example, the process of performing the speech recognition may be performed in all cases, with process of performing speaker recognition being initiated only if it is determined in step 78 that the command is one that requires authentication of the user before that command is performed.

As another example, the speaker recognition process may be performed in all cases, with the speech recognition process being initiated only if it is determined in step 62 (or in step 68) that it is the registered user who is speaking.

As a further example, the result of the first speaker recognition process may be compared against a threshold (perhaps a low threshold that is relatively easily satisfied), with the speech recognition process of step 76 being performed only if that first speaker recognition process provides a preliminary decision that it is the registered user who is speaking.

The examples described above refer to a first voice segment (for example representing a trigger phrase) and one second voice segment (for example representing a command), with the authentication decision being made based on the speaker recognition processes performed on those two voice segments.

In further embodiments, for example for use in situations in which there is an extended interaction between the user and the voice user interface, or the user is expected to speak for a longer period of time, the reliability of the process of authentication may be further improved by using more of the user's speech as an input.

For example, separate speech inputs, which are provided by the user in response to prompts from the voice user interface following a trigger phrase, might be considered as second, third, fourth etc voice segments. Similarly, a longer period of speech might be divided into second, third, fourth etc voice segments.

In such cases, a third speaker recognition process might be performed on the third speech voice segment, a fourth speaker recognition process might be performed on the fourth voice segment, and so on.

The results of these processes can then be combined. For example a combined result can be obtained by forming a weighted sum of the results from the separate processes. In that case, an interim authentication result can be output after performing the second speaker recognition process, with updated authentication results being output after performing the third and fourth speaker recognition processes, and so on.

Alternatively, a result can be obtained based on the second voice segment, with a new result being based on the second and third voice segments considered together, and a further new result being based on the second, third and fourth voice segments all being considered together, and so on, perhaps with older voice segments being discarded as the process continues.

Thus, the process of authenticating the speaker can be performed continuously.

The skilled person will thus recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Embodiments of the invention may be arranged as part of an audio processing circuit, for instance an audio circuit which may be provided in a host device. A circuit according to an embodiment of the present invention may be implemented as an integrated circuit.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Embodiments may be implemented in other forms of device such as a remote controller device, a toy, a machine such as a robot, a home automation controller or suchlike.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of processing a received signal representing a user's speech, the method comprising:

performing a first antispoofing process on a first portion of the received signal to obtain a first antispoofing score;

performing a second antispoofing process on a second portion of the received signal to obtain a second antispoofing score;

rejecting the user if either first antispoofing score or the second antispoofing score exceeds a respective first threshold antispoofing value, or if the first antispoofing score and the second antispoofing score both exceed a respective second threshold antispoofing value, wherein the respective second threshold antispoofing values are lower than the respective first threshold antispoofing values; and if the user is not rejected:

performing a first speaker recognition process on a first portion of the received signal, to obtain a first output result;

performing a second speaker recognition process on a second portion of the received signal, to obtain a second output result;

combining the first and second output results to obtain a combined output result indicating a likelihood that the user is a registered user;

determining if the indicated likelihood that the user is a registered user is higher than a speaker recognition threshold value; and if the indicated likelihood is higher than the speaker recognition threshold value:

performing a speech recognition process on the second portion of the received signal to obtain a command contained in the second portion of the received signal; and acting on the obtained command.

2. A method according to claim 1, comprising applying respective weighting values to the first and second output results and combining the weighted results.

3. A method according to claim 1, comprising applying the first and second output results as inputs to a neural network, and obtaining the combined output result as an output of the neural network.

4. A method according to claim 1, comprising combining the first and second output results based on at least one measure relating to a quality of a respective sample.

5. A method according to claim 4, wherein the at least one measure relating to the quality of the respective sample comprises one or more of the following:

a measure relating to a property of the respective portion of the received signal;

a measure relating to a property of the speech represented by the respective portion of the received signal;

a measure of an amount of speech represented by the respective portion of the received signal;

a measure of a degree of fit of the respective portion of the received signal to a background model of the respective speaker recognition process;

a measure relating to a degree of saturation of the respective portion of the received signal;

a measure of a signal-to-noise ratio of the respective portion of the received signal;

a measure of a signal-to-interference ratio of the respective portion of the received signal;

a measure of a direct-to-reflected ratio of the respective portion of the received signal;

a measure of a direction from which the respective portion of the received signal was received;

a measure of a range from which the respective portion of the received signal was received; and/or a measure relating to an antispoofing score obtained from a respective portion of the received signal.

6. A method according to claim 1, wherein the first and second speaker recognition processes are different.

7. A method according to claim 6, wherein the first and second speaker recognition processes use different models of the user's speech and/or use different background models.

8. A method according to claim 1, wherein the first portion of the received signal comprises a trigger phrase and the second portion of the received signal comprises a command.

9. A method according to claim 1, wherein the first portion of the received signal corresponds to a first time window and the second portion of the received signal corresponds to a second time window, and wherein the first time window does not overlap the second time window.

10. A method according to claim 1, wherein the first portion of the received signal corresponds to a first time window and the second portion of the received signal corresponds to a second time window, and wherein the first time window at least partially overlaps the second time window.

11. A method according to claim 10, wherein the second time window comprises the first time window.

12. A method according to claim 1, comprising performing at least one further speaker recognition process on at least one further portion of the received signal to obtain at least one respective further output result; and
combining the at least one further output result with the first and second output results to obtain the combined output result indicating a likelihood that the user is a registered user.

13. A method according to claim 1, further comprising performing speech recognition on at least the first portion of the received signal.

14. A computer program product, comprising a non-transitory computer-readable medium, and instructions for causing a suitably-programmed processor to perform a method according to claim 1.

15. A device for processing a received signal representing a user's speech, for performing speaker recognition, wherein the device is configured to:
perform a first antispoofing process on a first portion of the received signal to obtain a first antispoofing score;
perform a second antispoofing process on a second portion of the received signal to obtain a second antispoofing score;
reject the user if either first antispoofing score or the second antispoofing score exceeds a respective first threshold antispoofing value, or if the first antispoofing score and the second antispoofing score both exceed a respective second threshold antispoofing value, wherein the respective second threshold antispoofing values are lower than the respective first threshold antispoofing values; and,
if the user is not rejected:
perform a first speaker recognition process on a first portion of the received signal, to obtain a first output result;
perform a second speaker recognition process on a second portion of the received signal, to obtain a second output result;
combine the first and second output results to obtain a combined output result indicating a likelihood that the user is a registered user;
determine if the indicated likelihood that the user is a registered user is higher than a speaker recognition threshold value; and
if the indicated likelihood is higher than the speaker recognition threshold value:
perform a speech recognition process on the second portion of the received signal to obtain a command contained in the second portion of the received signal; and
act on the obtained command.

* * * * *